(12) United States Patent
Kisaka

(10) Patent No.: US 6,754,031 B1
(45) Date of Patent: Jun. 22, 2004

(54) METHOD AND APPARATUS FOR CONTROLLING AN ACCESS MECHANISM WITHIN A DISK DRIVE

(75) Inventor: Masashi Kisaka, Yokohama (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 686 days.

(21) Appl. No.: 09/629,366

(22) Filed: Aug. 1, 2000

(30) Foreign Application Priority Data

Aug. 24, 1999 (JP) ............................................. 11-236247

(51) Int. Cl.[7] ............................................. G11B 5/596
(52) U.S. Cl. ........................................................... 360/77.02
(58) Field of Search ................................. 360/77.02, 75, 360/77.08, 78.04, 78.06, 78.07, 78.09, 78.11, 77.04, 78.14, 73.11

(56) References Cited

U.S. PATENT DOCUMENTS

| | | | | |
|---|---|---|---|---|
| 4,168,457 A | * | 9/1979 | Rose ........................... | 318/561 |
| 4,494,159 A | * | 1/1985 | Takayama et al. ........ | 360/78.11 |
| 4,954,907 A | * | 9/1990 | Takita ...................... | 360/78.07 |
| 4,954,909 A | * | 9/1990 | Sengoku ................... | 360/78.04 |
| 5,021,898 A | * | 6/1991 | Sakai et al. ............... | 360/78.04 |
| 5,051,851 A | * | 9/1991 | Sakurai .................... | 360/77.06 |
| 5,383,068 A | * | 1/1995 | Shimizu et al. .......... | 360/78.06 |
| 5,392,174 A | * | 2/1995 | Suzuki ..................... | 360/78.06 |
| 5,459,624 A | * | 10/1995 | Erickson et al. ......... | 360/77.02 |
| 5,469,414 A | * | 11/1995 | Okamura .................. | 360/78.06 |
| 5,521,891 A | * | 5/1996 | Nakane .................... | 369/44.28 |
| 5,754,358 A | * | 5/1998 | Yatsu ....................... | 360/78.09 |
| 5,822,143 A | * | 10/1998 | Cloke et al. ................... | 360/65 |
| 6,118,616 A | * | 9/2000 | Jeong ....................... | 360/78.07 |
| 6,166,876 A | * | 12/2000 | Liu .......................... | 360/78.04 |
| 6,243,226 B1 | * | 6/2001 | Jeong ....................... | 360/78.07 |
| 6,304,408 B1 | * | 10/2001 | Cole ........................ | 360/77.02 |

* cited by examiner

Primary Examiner—David Hudspeth
Assistant Examiner—Fred F. Tzeng
(74) Attorney, Agent, or Firm—Robert B. Martin; Bracewell & Patterson, L.L.P.

(57) ABSTRACT

A method and apparatus for controlling an access mechanism within a disk drive are disclosed. A servo apparatus comprises a first detection module for discretely detecting a displacement value of an access mechanism from a target position at predetermined time intervals, a first feedback module for calculating a first feedback value on the basis of the detected displacement value, a second detection module for discretely detecting a physical value, including the speed of the access mechanism, at least once at each of the predetermined time intervals, a second feedback module for calculating a second feedback value on the basis of the physical value, including the speed, and a motor driving module for driving a motor according to the first feedback value and the second feedback value.

12 Claims, 12 Drawing Sheets

[Figure 1]
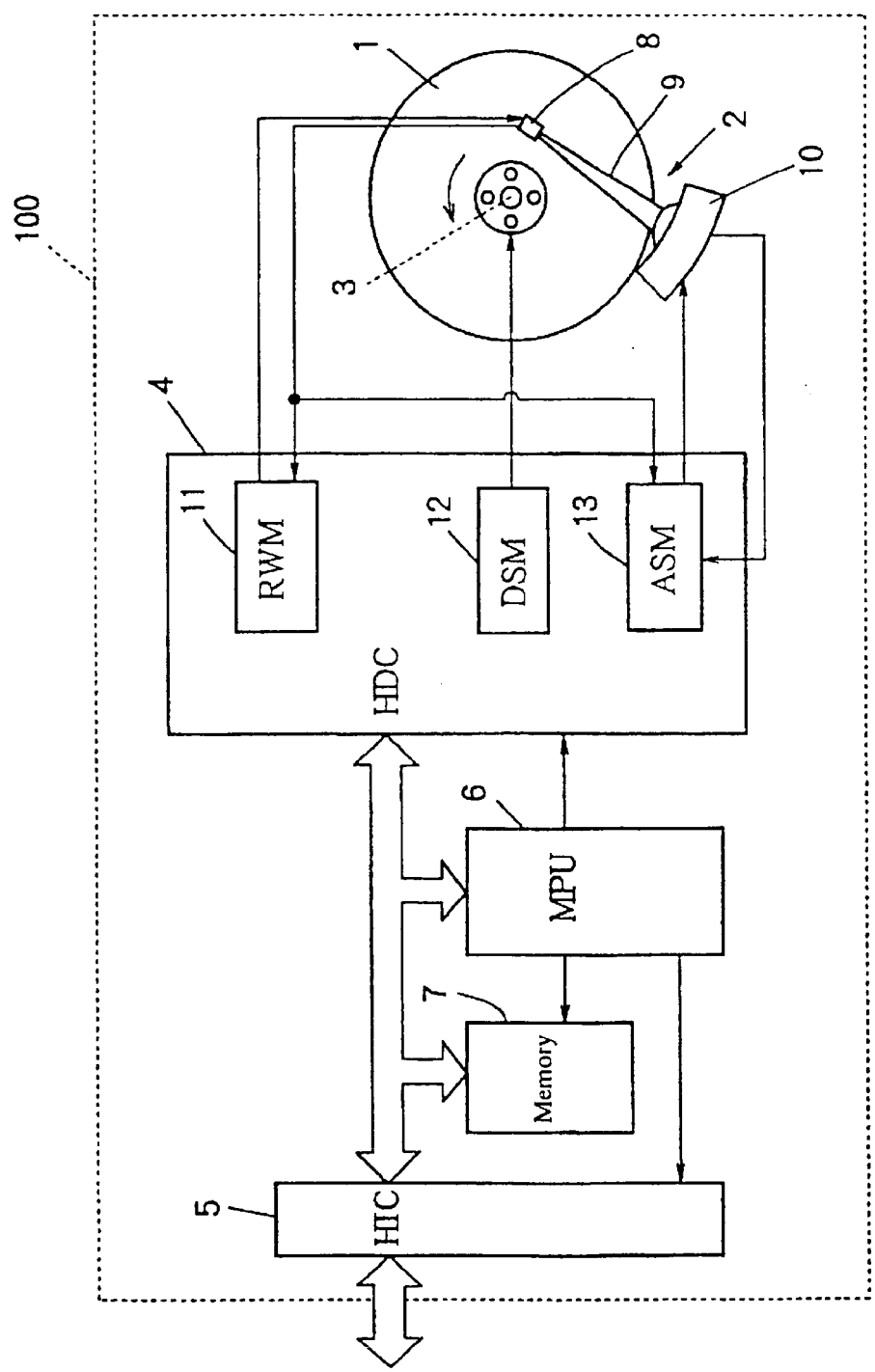

[Figure 2]
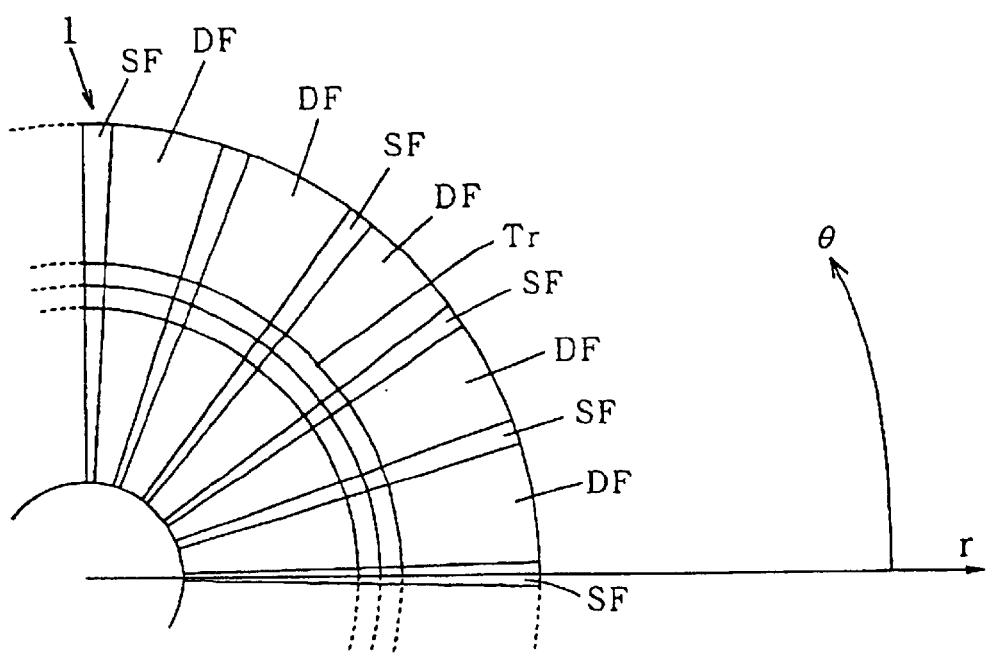

[Figure 3]
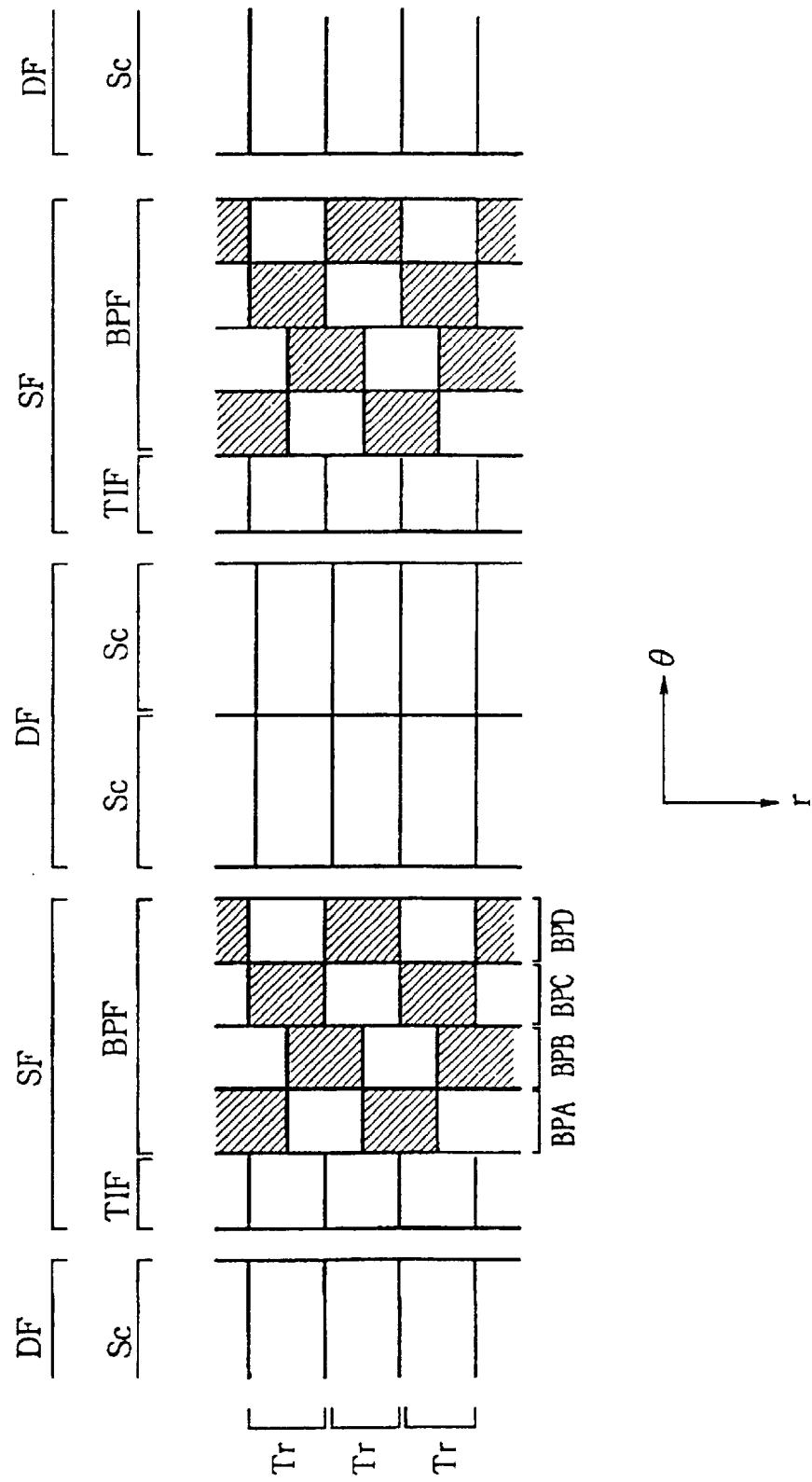

[Figure 4]
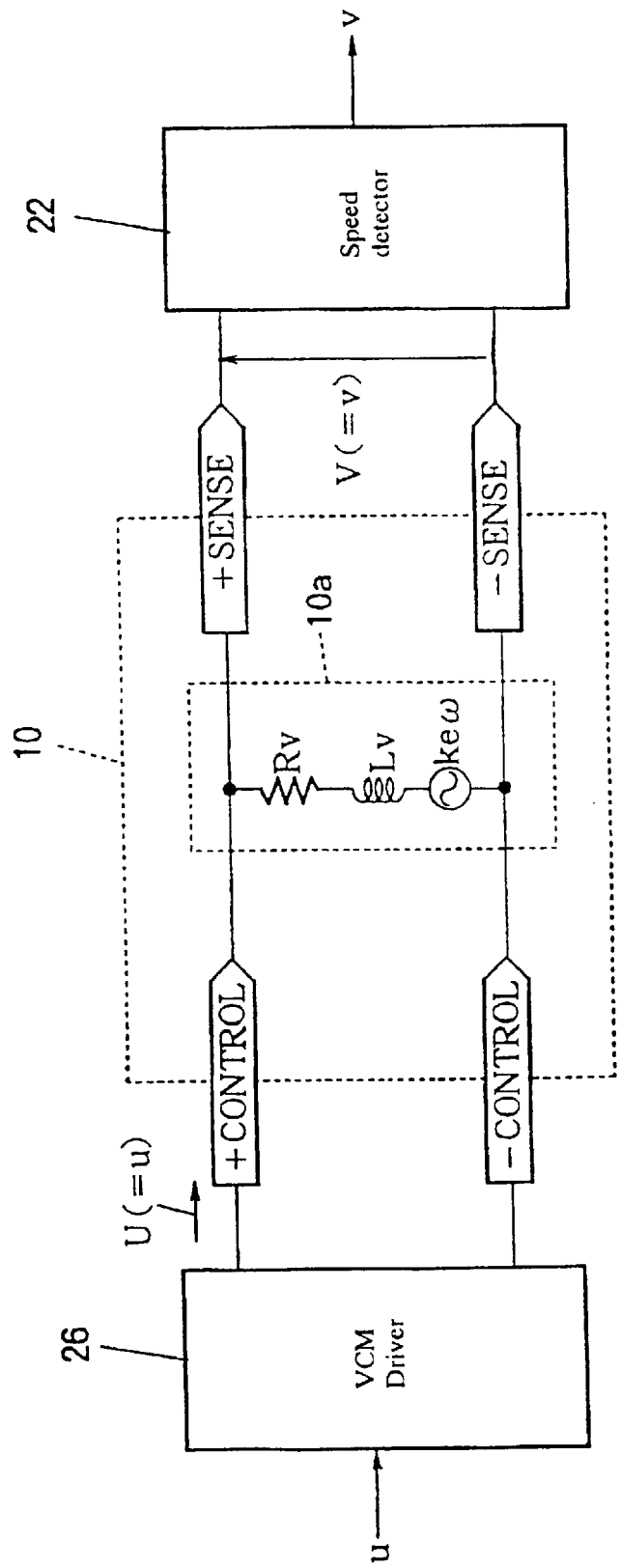

[Figure 5]
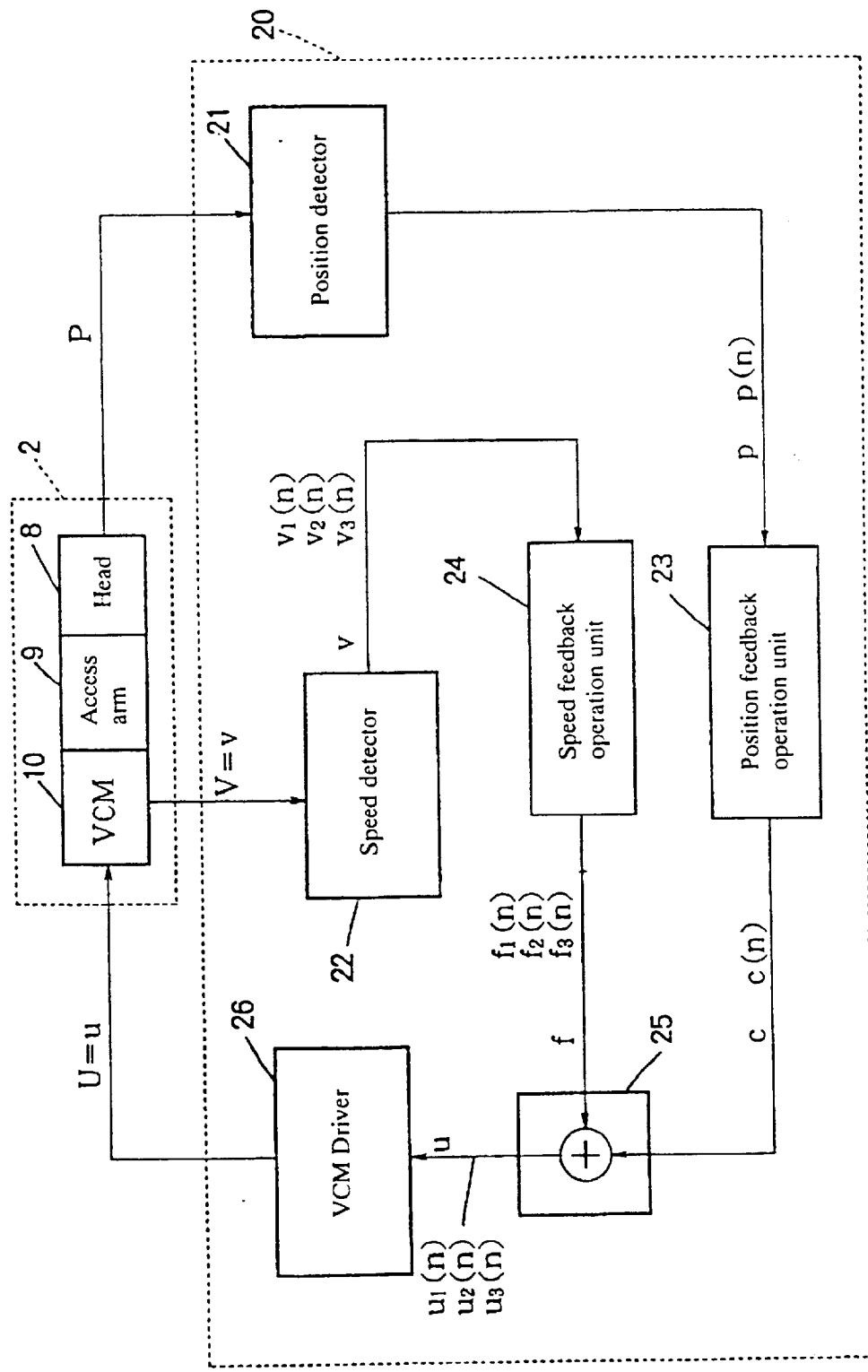

[Figure 6]
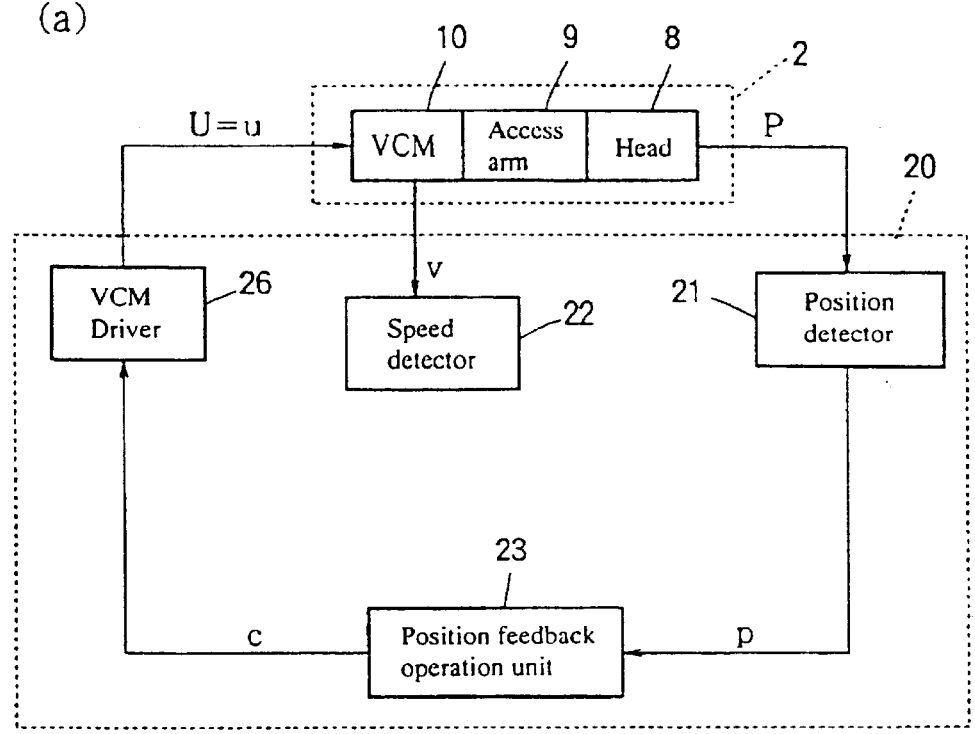
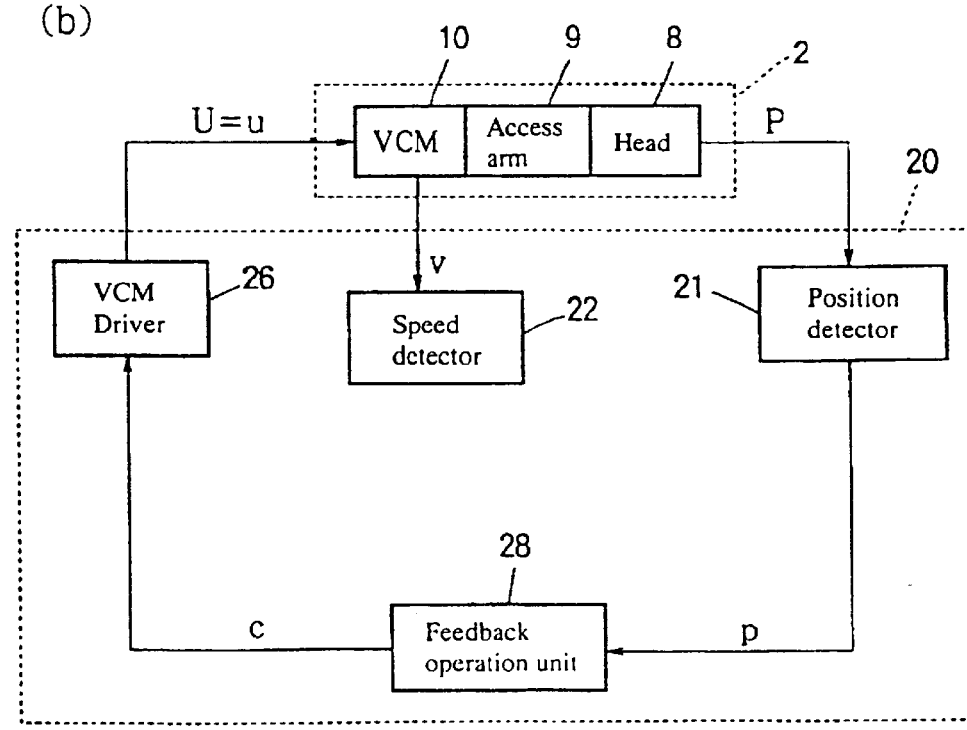

[Figure 7]
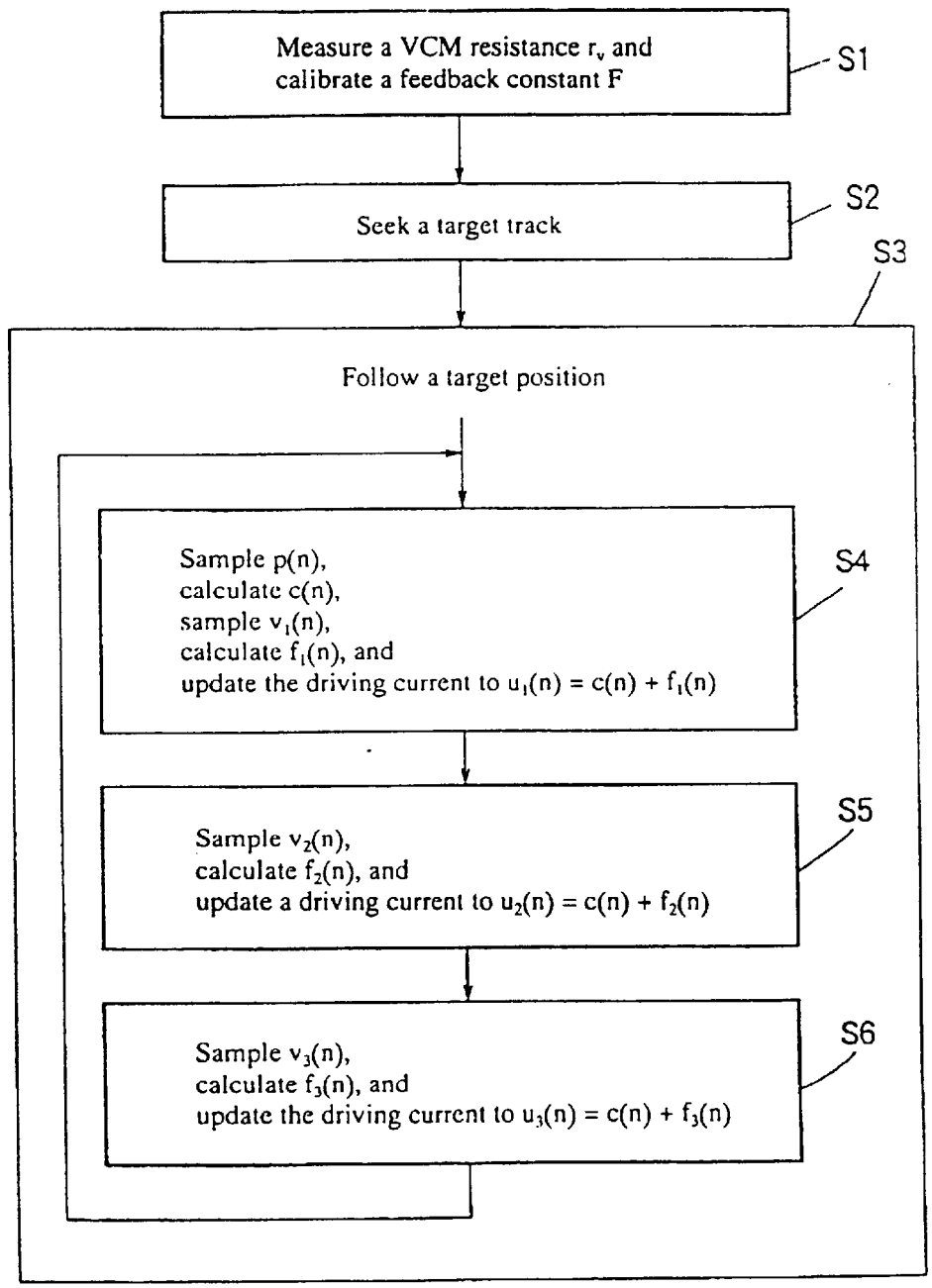

[Figure 8]
(a)
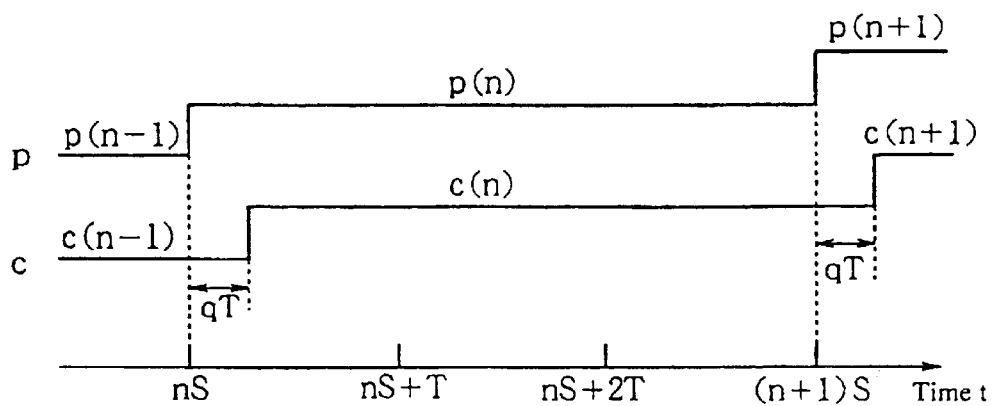
(b)
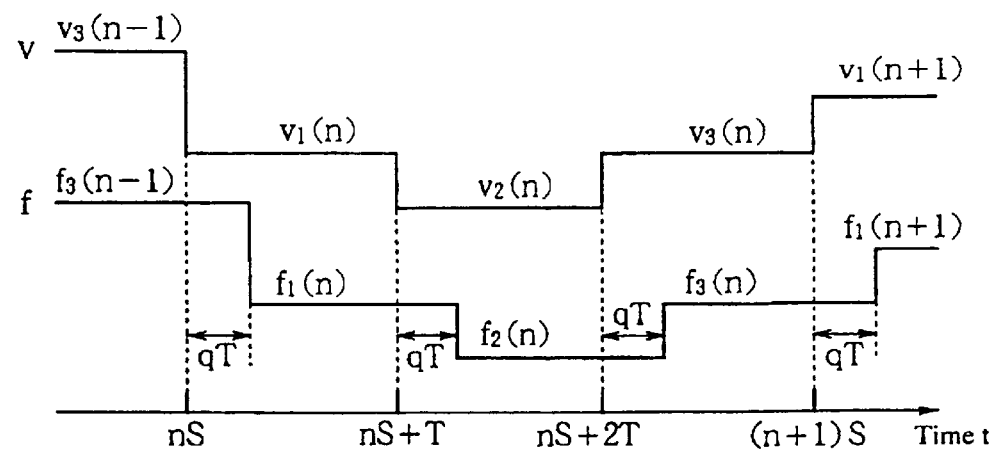
(c)
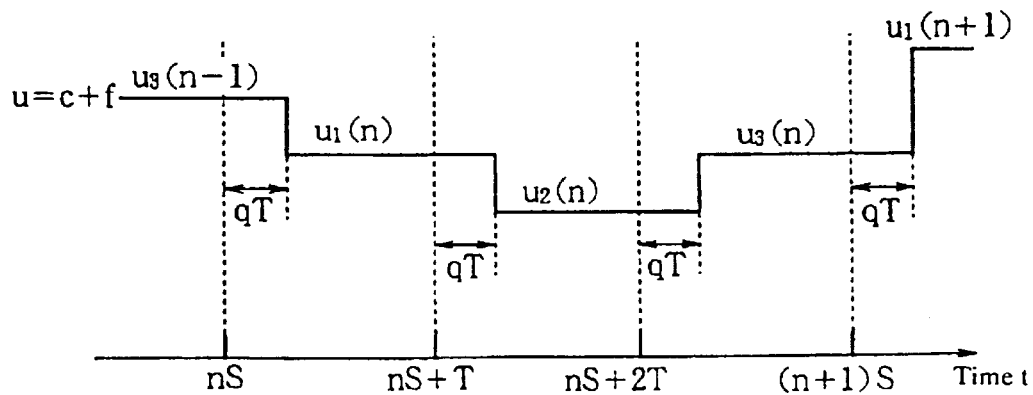

[Figure 9]
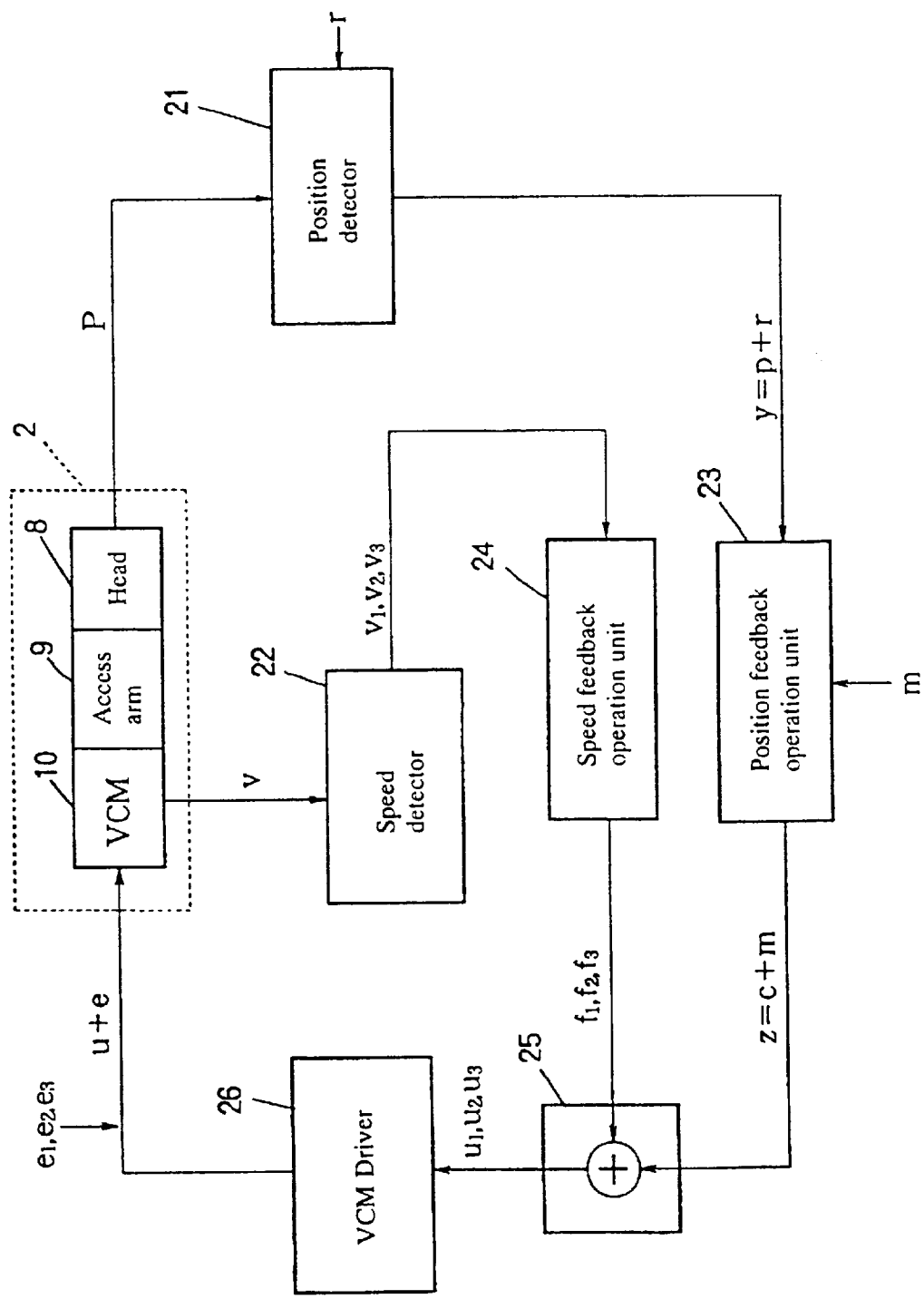

[Figure 10]
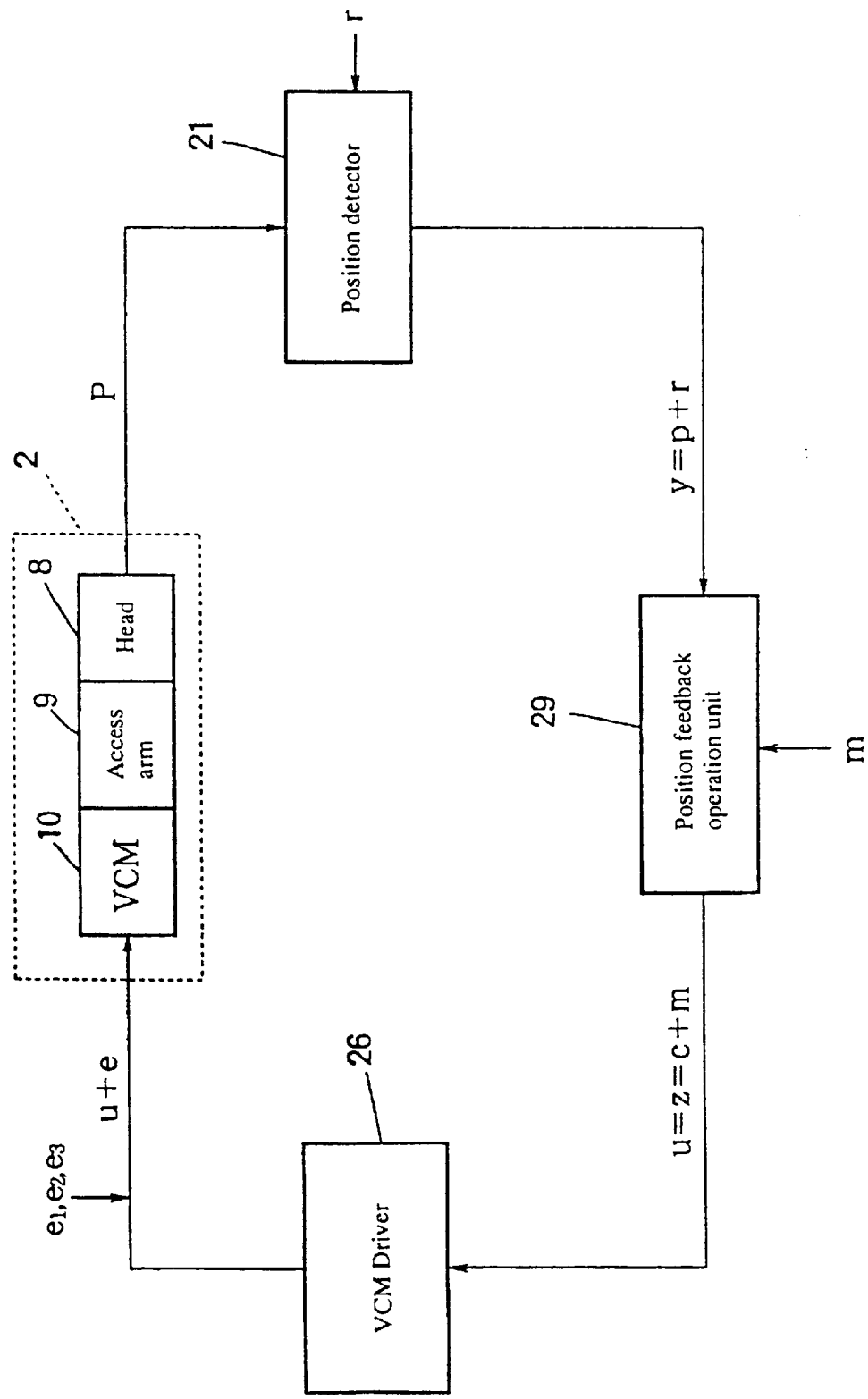

[Figure 11]
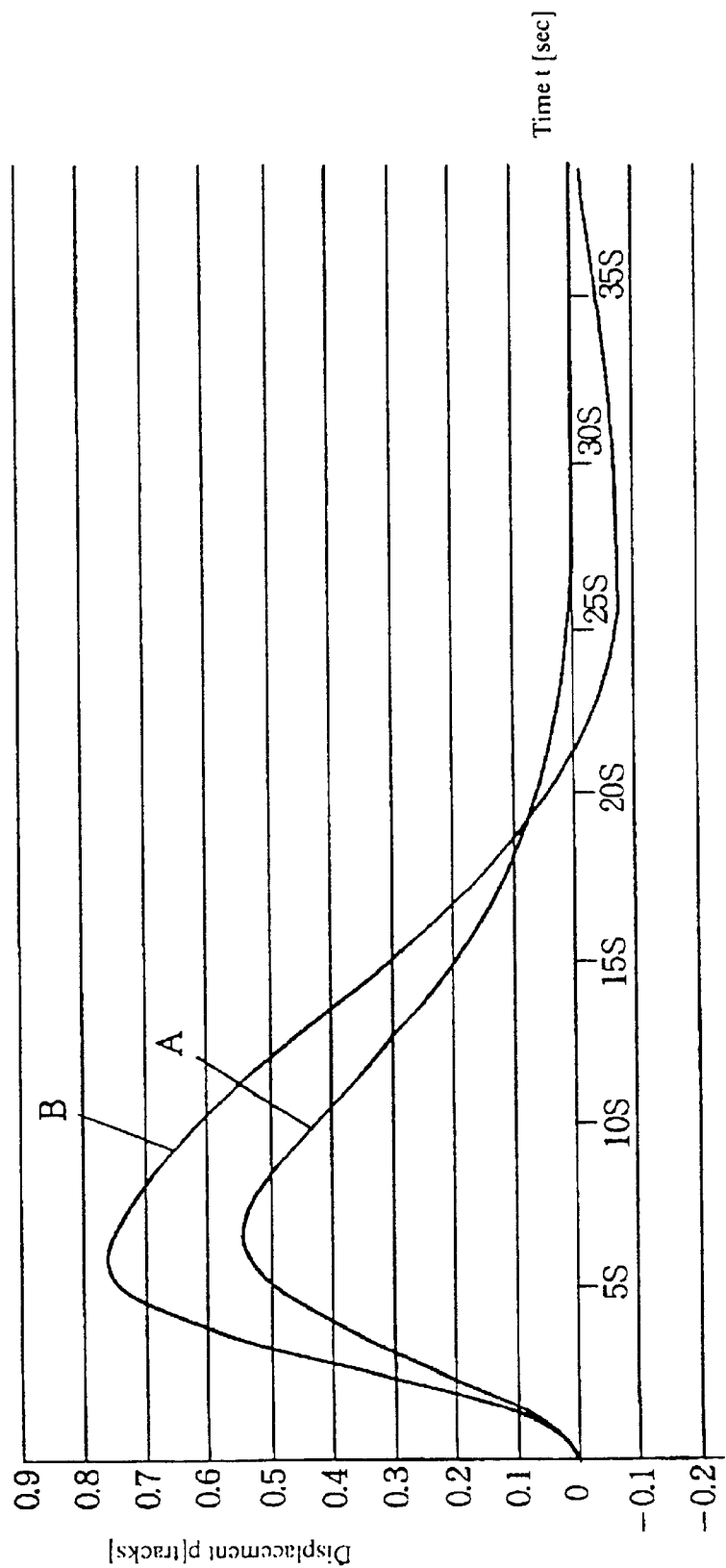

[Figure 12]
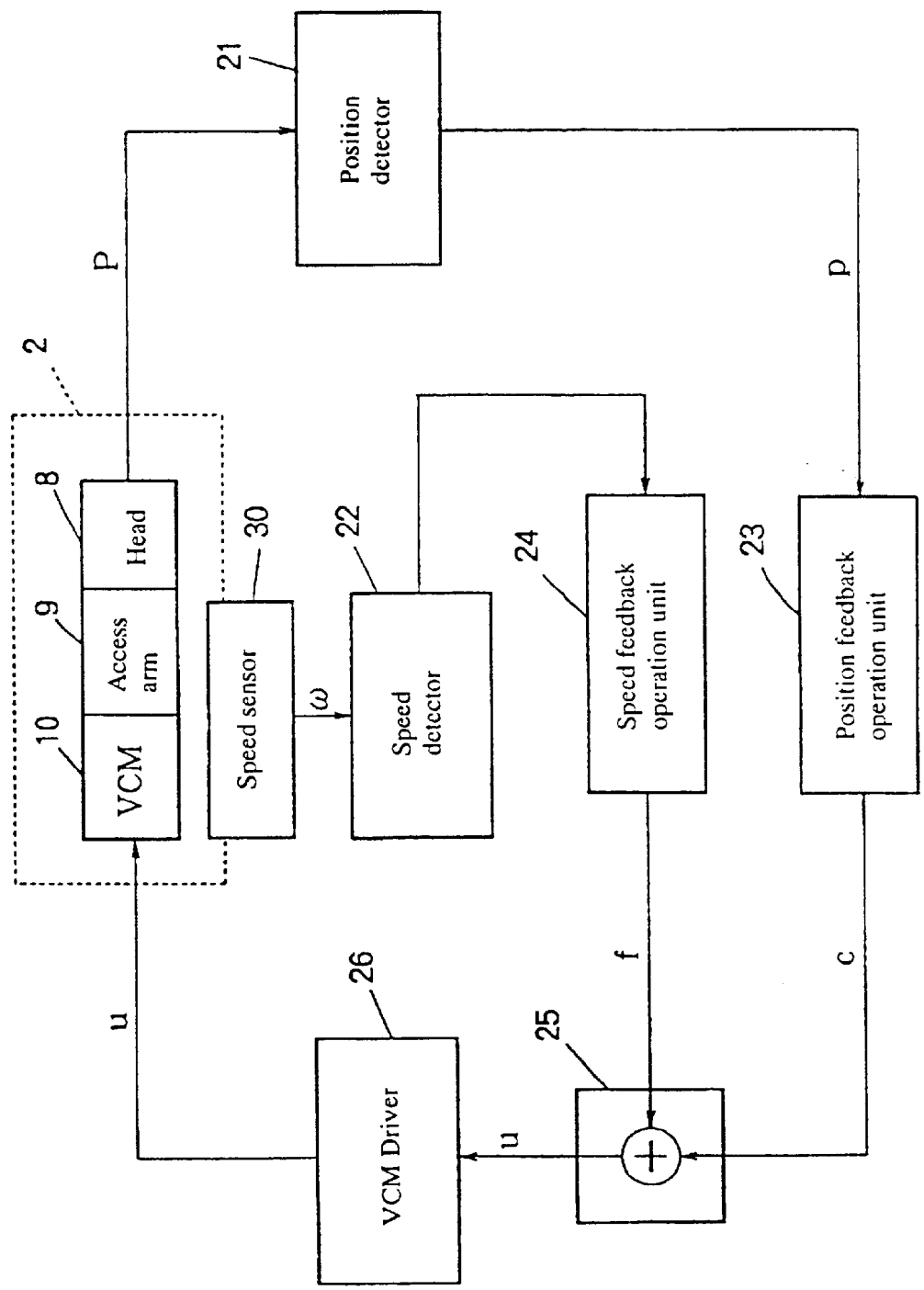

METHOD AND APPARATUS FOR CONTROLLING AN ACCESS MECHANISM WITHIN A DISK DRIVE

BACKGROUND OF THE INVENTION

1. Technical Field

The present invention relates to disk drives in general, and in particular to a method for controlling disk accesses within a disk drive. Still more particularly, the present invention relates to a method and apparatus for detecting a position of an access mechanism and Making the access mechanism follow a target position of a disk within a disk drive.

2. Description of the Prior Art

A hard disk drive includes at least one disk, a voice coil motor (VCM), an access mechanism having a data read/write head located at an end of an access arm and being driven along the radial direction of a disk by the VCM, and a servo means for detecting a displacement of the access mechanism from a target position via a read signal of positional information (servo information) previously recorded on a disk surface, and making the access mechanism be positioned at and follow the target position in a target track.

For a hard disk drive having a sector servo system, data fields and servo fields are alternately arranged in the longitudinal direction of a track of a disk. In addition, a servo means of the sector servo system discretely detects a displacement of an access mechanism from a target position, controls the driving current of VCM on the basis of the displacement sampled, and makes the access mechanism follow the target position. A time interval of the above-described sampling is determined by a metric interval between servo fields in a track and the disk rotation speed.

There is a tendency for increasing the density of data storage in hard disk drives. The track width typically becomes narrower in order to increase the data storage density. As the track width becomes narrower, the tolerance to a deviation of an access mechanism from a target position during track following also decreases. Although it is necessary to shorten a sampling time interval of a displacement from the target position in order to reduce the influence of disturbance applied to an access mechanism, it is also necessary to store as much servo information on a disk surface as possible. As a result, the space of data fields on a disk that a user can use becomes smaller.

Consequently, it would be desirable to provide a method and apparatus that can reduce the influence of disturbance applied to an access mechanism and increase follow-up precision to a target position.

SUMMARY OF THE INVENTION

In accordance with a preferred embodiment of the present invention, a servo apparatus comprises a first detection means for discretely detecting a displacement value of an access mechanism from a target position at predetermined time intervals, a first feedback means for calculating a first feedback value on the basis of the detected displacement value, a second detection means for discretely detecting a physical value, including the speed of the access mechanism, at least once at each of the predetermined time intervals, a second feedback means for calculating a second feedback value on the basis of the physical value, including the speed, and a motor driving means for driving a motor according to the first feedback value and the second feedback value.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 is a block diagram of a hard disk drive in accordance with a preferred embodiment of the present invention;

FIG. 2 is a configuration diagram of a disk surface within the hard disk drive from FIG. 1;

FIG. 3 is a structural drawing of tracks partitioned on the disk surface within the hard disk drive from FIG. 1;

FIG. 4 is a circuit model diagram of a voice coil motor;

FIG. 5 is a block diagram of an access servo loop within the hard disk drive from FIG. 1, according to a preferred embodiment of the present invention;

FIG. 6 is a block diagram of an access servo loop within the hard disk drive from FIG. 1 during a track seek, according to a preferred embodiment of the present invention;

FIG. 7 is a flow chart illustrating the operations of an access servo unit within the hard disk drive from FIG. 1, according to a preferred embodiment of the present invention;

FIGS. 8A to 8C are timing charts of an access servo loop within the hard disk drive from FIG. 1 during track following, according to a preferred embodiment of the present invention;

FIG. 9 is a block diagram of an access servo loop within the hard disk drive from FIG. 1 when a disturbance is applied to the access mechanism;

FIG. 10 is a block diagram of an access servo loop in a conventional disk apparatus when the disk apparatus performs track following;

FIG. 11 is a graph showing the simulation result of following characteristics by using a servo loop according to a preferred embodiment of the present invention; and FIG. 12 is a block diagram of an access servo loop in a hard disk drive, according to a second embodiment of the present invention.

DETAILED DESCRIPTION OF A PREFERRED EMBODIMENT

Referring now to the drawings and in particular to FIG. 1, there is depicted a block diagram of a hard disk drive according to a preferred embodiment of the present invention. As shown, a hard disk drive 100 comprises magnetic disks 1, an access mechanism 2 that rotates over and accesses magnetic disks 1, a spindle motor 3 for rotating magnetic disks 1, a hard disk controller (HDC) 4, a host interface controller (HIC) 5 for communicating a host apparatus, a microprocessor unit (MPU) 6, and a memory module 7.

FIG. 2 graphically illustrates a configuration of a surface of a disk such as disks 1. The disk surface is partitioned into data fields DF where data is recorded, and servo fields SF where the positional information is recorded. Multiple servo fields SF are provided in the radial direction of disk 1, and data fields DF are interleaved between the servo fields. In addition, the disk surface is partitioned into multiple cylindrical tracks Tr.

FIG. 3 is a structural drawing of tracks Tr that are partitioned on a disk surface. The data field DF is partitioned into several data sectors Sc in each track Tr. These data sectors Sc are arranged in the longitudinal direction of the tracks Tr. User data can be recorded in each data sector Sc. The size of data recorded in each data sector Sc is, for example, 512 bytes.

A track identification number (track ID) is assigned to each track Tr on a disk surface. In each track Tr, several data sectors Sc (two shown in FIG. 3) are arranged between a servo field SF and the next servo field SF.

A track ID recording field TIF and a burst pattern recording field BPF are provided in each servo field SF on a disk surface. In addition, in any one of servo fields SF, a track start pattern recording field TSF in which a pattern for identifying a recorded track start position is provided.

In a track ID recording field TIF within each track Tr, a track ID of the track can be previously recorded in Gray code (cyclic binary code). In addition, a burst pattern is recorded beforehand in a burst pattern recording field BPF.

The above-described test pattern is composed of burst pattern series BPA, BPB, BPC, and BPD that are arranged respectively along the radial direction of disk 1. In each burst pattern series, a signal recording field, where a signal is recorded, and a non-signal recording field, where no signal is recorded, are alternately arranged. The burst pattern series BPA and BPB configure a main burst pattern. In addition, burst pattern series BPC and BPD configure a slave burst pattern.

A boundary between a signal recording field and a non-signal recording field in the burst pattern series BPA and a boundary between a signal recording field and a non-signal recording field in the burst pattern series BPB are present respectively in a center in the direction of the width of a track Tr. In addition, a boundary between a signal recording field and a non-signal recording field in the burst pattern series BPC and a boundary between a signal recording field and a non-signal recording field in the burst pattern series BPD are present respectively on a boundary between tracks Tr. Each dimension of the signal recording field and non-signal recording field in the radial direction of disk 1 is equal to the width of the track Tr. The signal recording field of the burst pattern series BPA and the signal recording field of the burst pattern series BPB are mutually staggered. Similarly, the signal recording field of the burst pattern series BPC and the signal recording field of the burst pattern series BPD are mutually staggered.

Access mechanism 2 has a read/write head 8 that writes/read data to/from disk 1, an access arm 9 that has head 8 at the end thereof and rotates in the radial direction of disk 1, and a voice coil motor (VCM) 10 that moves access arm 9.

FIG. 4 is a schematic diagram of a voice coil of VCM 10. A voice coil 10a of VCM 10 can be modeled as a serial circuit composed of a resistor $R_v$, an inductance $L_v$, and a back electromotive force. Let a driving current passing through voice coil 10a be U, let a resistance of voice coil resistor $R_v$ be $r_v$, let a speed of access mechanism 2 be $\omega$, let a back electromotive force constant of VCM 10 be $K_e$, let a voltage between terminals of voice coil 10a (a voltage between a +SENSE terminal and a −SENSE terminal, or a voltage between a +CONTROL terminal and a −CONTROL terminal in FIG. 4) be V, and let a back electromotive force generated by a variation of the driving current U be $\Delta V$ ($=L_v(dU/dt)$), and $$V=r_v U+K_e\omega+\Delta V \tag{0}$$

In equation (0), $K_e\omega$ is a back electromotive force generated by the motion of access mechanism 2. If the driving current U is made to be constant and time, which is sufficiently longer than a time constant derived from the resistor $R_v$ and inductance $L_v$, has passed since the driving current U was stepwise changed, $\Delta V=0$, and hence equation (0) becomes:

$$V=r_v U+K_e\omega$$

In addition, if access mechanism 2 is fixed (for example, access mechanism 2 is made to contact to an inner crash stop) and the driving current U that is constant is passed through voice coil 10a, $\omega=0$, and hence:

$$V=r_v U$$

HDC 4 has a read/write module (RWM) 11, a disk servo module (DSM) 12, and an access servo module (ASM) 13. RWM 11 sends data to be recorded in disk 1 (write data), to a write element of head 8 and extracts data, recorded in disk 1 (read data) from a read signal from disk 1 by means of a read element of head 8 with collaborating with MPU 6. In addition, DSM 12 drives spindle motor 3 and makes the rotation of disk 1 follow a target value with collaborating with MPU 6. ASM 13 drives VCM 10, seeks a target track in disk 1, and positions access mechanism 2 at a target position in the target track to make access mechanism 2 follow target position, with collaborating with MPU 6.

Memory module 7 stores a control program executed by MPU 6, and data, parameters, tables, and the like that are necessary for controlling disk apparatus 100. The above-described control program is stored in a non-volatile recording field provided in memory module 7. Alternatively, the control program is previously recorded in a special field secured on a disk surface, and is read into a volatile recording field in memory module 7 from the above-described special field on the disk surface when hard disk drive 100 is activated.

MPU 6 controls HDC 4 and HIC 5 according to the control program stored in memory module 7. HIC 5 and MPU 6 receive data transmitted from a host apparatus (write commands, read commands, write data, logical addresses of data sectors, and the like). In addition, HIC 5 and MPU 6 transmit data, which is read from disk 1, to the host apparatus.

When a write command is inputted, HDC 4 and MPU 6 make access mechanism 2 access the target track of disk 1, and writes data in a data sector of the track. In addition, when a read command is inputted, HDC 4 and MPU 6 make access mechanism 2 access the target track of disk 1 and reads data recorded in a data sector of the track.

ASM 13 of HDC 4 and MPU 6 configure an access servo unit that seeks the target track and makes access mechanism 2 follow the target position. The position control of access mechanism 2 is composed of a track seek procedure for seeking the target track and moving head 8 of access mechanism 2 over the target track, and a track following procedure for positioning head 8 over the target position in the width direction of the target track and making head 8 follow the target position.

FIG. 5 is a block diagram of an access servo loop within the hard disk drive from FIG. 1. In FIG. 5, access servo unit 20, which is composed of ASM 13 and MPU 6, seeks target track, and makes access mechanism 2 follow the target position, has a position detector 21 (first detection means), a speed detector 22 (second detection means), a position feedback operation unit 23 (first feedback means), a speed feedback operation unit 24 (second feedback means), an adder 25, and a VCM driver 26. This access servo unit 20 performs negative feedback so that the displacement value p of access mechanism 2 from the target position may become zero.

Position detector 21 detects a displacement value p (digital value) of access mechanism 2 from the target position. Position detector 21 samples a position signal (a track ID signal and a burst pattern signal) from a read signal P (analog signal) read from a disk surface, which is outputted by access mechanism 2, at time intervals S, and calculate the displacement value p of access mechanism 2 from the target position on the basis of this position signal. Since a signal and the above-described position signal are mixed in time series in the read signal P, the position signal extracted is a discrete signal.

Let digital values of read signal P of the burst pattern series BPA, BPB, BPC, and BPD be ad, bd, cd, and dd, respectively, and position detector 21 calculates a main position detection amount mpes and a slave position detection amount spes by using the following equations:

$$mpes=(ad-bd)/(ad+bd)$$

$$spes=(cd-dd)/(cd+dd)$$

and generates a position detection amount pes from the mpes or spes. A pes, which is an amount expressing a position of head 8 in each track, becomes zero when head 8 is positioned at the center of a track, and becomes the maximum value or minimum value when head 8 is at the boundary between tracks.

Then, position detector 21 calculates the displacement value p of head 8 from the target position in the target track by using the track ID detected from the read signal, the position detection amount pes, an ID of the target track, and the target position in the target track. When access mechanism 2 follows the target position, p=0. Here, let the unit of the displacement value p be "track (width)." If access mechanism 2 deviates from the target position by one track-width, p=1. In addition, if access mechanism 2 is within the target track, p<1.

Speed detector 22 detects a voltage value v (digital value) between terminals of voice coil of VCM 10 (hereinafter, this voltage is called a VCM voltage) at the timing that is the same as the detection timing of the displacement value p and the timing of interpolating the detection timing of the displacement value p. Speed detector 22, as shown in FIG. 4, is connected to both terminals of voice coil 10a of VCM 10, samples a VCM voltage V (analog voltage) at time intervals T (=S/3), and transforms the VCM voltage V into a VCM voltage value v. Therefore, v=αV (α is a constant). Here, let α be 1. In addition, in the following description, the VCM voltage V inputted from VCM 10 to speed detector 22 and the VCM voltage value v inputted from speed detector 22 to speed feedback operation unit 24 are also called a VCM voltage v simply.

Position feedback operation unit 23, speed feedback operation unit 24, and adder 25 calculate a feedback value (driving current) u (digital value) on the basis of the displacement value p and VCM voltage value v. Position feedback operation unit 23 obtains a position feedback value c on the basis of the displacement value p, inputted from position detector 21, by calculation, and updates the position feedback value c inputted to adder 25. Position feedback operation unit 23 updates the position feedback value c (first feedback value) at the time intervals S. Contents of calculation in position feedback operation unit 23 will be described later.

Speed feedback operation unit 24 obtains a speed feedback value f on the basis of the VCM voltage value v, inputted from speed detector 22, by calculation. Furthermore, speed feedback operation unit 24 updates speed feedback value f (second feedback value), inputted to adder 25, in the timing being the same as the update timing of the position feedback value c and the timing of interpolating the update timing of the position feedback value c. This speed feedback operation unit 24 updates the speed feedback value f at the time intervals T (=S/3).

As described later, the speed feedback value f calculated on the basis of the VCM voltage value v is proportional to a speed variation value of the access mechanism 2. In access servo unit 20, the speed variation of access mechanism 2 is negatively fed back at the time intervals T by the speed feedback operation unit 24. Contents of calculation in speed feedback operation unit 24 will be described later.

Adder 25 adds the position feedback value c, inputted from the position feedback operation unit 23, to the speed feedback value f, inputted from the speed feedback operation unit 24, and inputs a driving current value u=c+f to VCM driver 26. The adder 25 and VCM driver 26 configure motor driving means for driving VCM 10 according to the position feedback value c (first feedback value) and the speed feedback value f (second feedback value).

VCM driver 26 controls the driving current (analog current) U of VCM 10 according to the driving current value u, and drives VCM 10. VCM driver 26, as shown in FIG. 4, passes the driving current u through voice coil 10a of VCM 10, and controls the driving current U so that the driving current U may follow the driving current value u. Therefore, U=βu (β is a constant). Here, β=1. In addition, in the following description, the driving current value u, inputted from adder 25 to VCM driver 26, and the driving current U, which VCM driver 26 passes through VCM 10, are also called a driving current u simply.

At the time of a track seek and track following, the configuration of access servo unit 20 can be the configuration shown in FIG. 5. Nevertheless, the precision of the control at the time of the track seek, which is equal to that at the time of the track following, is not required. Therefore, so as to reduce calculation delay time and to reduce calculation load to MPU 6, the configuration of access servo unit 20 is made simpler than that shown in FIG. 5.

FIGS. 6A and 6B are block diagrams of an access servo loop (access servo unit 20) at the time of the track seek. The same reference numerals in FIG. 6 are assigned to the same parts as those in FIG. 5. Access servo unit 20 at the time of the track seek in FIG. 6A is access servo unit 20 in FIG. 5 in such a case that the operation of speed feedback operation unit 24 is stopped (speed feedback value f=0) and the position feedback value c by position feedback operation unit 23 is made to be the feedback value (driving current value) u. In addition, the access servo unit 20 at the time of the track seek in FIG. 6B is access servo unit 20 in FIG. 5 in such a case that the operation of speed feedback operation unit 24 is stopped (speed feedback value f=0) and position feedback operation unit 23 is changed to feedback operation unit 28. Feedback operation unit 28 calculates the feedback value (driving current value) u on the basis of only the displacement value p. The calculation by feedback operation unit 28 is made simpler than that by position feedback operation unit 23.

In this manner, access servo unit 20 samples the displacement value p at the time intervals s at the time of a track seek, calculates the position feedback value c on the basis of this displacement value p, and updates the driving current value u (=c) at the time intervals S. In addition, the access servo unit 20 samples the displacement value p at the time intervals S at the time of track following, calculates the position feedback value c on the basis of this displacement value p, at the same time, samples the VCM voltage value v in the time intervals T (S/3), calculates the speed feedback value f on the basis of this VCM voltage value v, and updates the driving current value u (=c+f) at the time intervals T.

FIG. 7 is a flow chart for explaining the operations of access servo unit 20. Access servo unit 20 measures a resistance $r_v$ of the voice coil resistor $R_v$ (see FIG. 4) at step S1 before a disk access (track seek and track following), and calibrates a feedback constant F (a constant set beforehand to the voice coil resistance $r_v$ measured) used for the calculation in the speed feedback operation unit 24.

The voice coil resistance $r_v$ is measured, for example, by using the following procedure. With fixing access mechanism 2 (for example, with contacting access mechanism 2 to an inner crash stop), a constant driving current $U_{cab}$ is passed through VCM 10 by VCM driver 26, and a VCM voltage $V_{cab}$ is measured by speed detector 22 after time, which is sufficiently longer than a time constant derived from the voice coil resistor $R_v$ and inductance $L_v$, has passed. Since access mechanism 2 is stopped, voice coil resistance $r_v=V_{cab}/U_{cab}$ (=F). The above-described inner crash stop determines a rotatable limitation of access mechanism 2 in the inner diameter side of the disk. If contacting to the inner crash stop, access mechanism 2 cannot rotate any more toward the inner diameter side of the disk.

Next, at step S2, the access servo unit 20 in FIGS. 6A and 6B searches the target track by the access servo loop, and positions the access mechanism 2 over the target track (track seek). The access servo unit 20 samples the displacement value p of access mechanism 2 from the target position in the target track at the time intervals S and updates the driving current value u at the time intervals S on the basis of this displacement value p. Owing to this, access servo unit 20 applies negative feedback so that the displacement value p may become zero, and positions the access mechanism 2 over the target track.

After completion of the track seek, at step S3, the control of access mechanism 2 is switched to the control by access servo unit 20 in FIG. 5. Then, the access servo loop in FIG. 5 makes access mechanism 2 follow the target position in the target track (track following). The access servo unit 20 samples the displacement value p of the access mechanism 2 from the target position in the time intervals S, and calculates the position feedback value c on the basis of the displacement value p. At the same time, the access servo unit 20 samples the VCM voltage value v at the time intervals T (=S/3), calculates the speed feedback value f on the basis of the displacement value p and VCM voltage value v, and updates the driving current value u (=c+f) at the time intervals T. Owing to this, the access servo unit 20 applies negative feedback so that the displacement value p may become zero, and positions the access mechanism 2 over the target track. In addition, just before the completion of the track seek, the above control switching is prepared by operating the position feedback operation unit 23 in the access servo unit 20 in FIG. 5 beforehand.

The above-described step S3 is executed by a loop of steps S4, S5, and S6, The steps S4, S5, and S6 will be described in detail below by using FIGS. 5 and 8A to 8C.

FIGS. 8A to 8C are timing charts of an access servo loop (see FIG. 5) at the time of the track following. FIG. 8A is a timing chart of the displacement value p and position feedback value c, FIG. 8B is a timing chart of the VCM voltage value v and speed feedback value f, and FIG. 8C is a timing chart of the driving current value u.

In FIGS. 5, 7, and 8A to 8C, reference character S denotes a sampling time interval of the displacement value p, and T (=S/3) denotes a sampling time interval of the VCM voltage value v. In addition, qT denotes delay time from the displacement value p being sampled to the position feedback value c being updated, and also delay time from the VCM voltage value v being sampled to the speed feedback value f being updated.

The sampling time interval S of the displacement value p (therefore, an update time interval of the position feedback value c) is specified by the metric interval of the servo fields in a track and the rotational speed of the disk 1. On the other hand, although the sampling time interval T of the VCM voltage value v (therefore, an update time interval of the speed feedback value f) is defined as T=S/3 here, it is possible to arbitrarily set the VCM voltage value v. In addition, it is also possible to arbitrarily set the sampling timing of the VCM voltage value v (therefore, the update timing of the speed feedback value f). Nevertheless, there are several things to be considered in regard to the sampling time interval and sampling timing of the VCM voltage value v, as described later.

In addition, p(n) (n is zero or an arbitrary positive integer) is the displacement value p sampled at time t=nS, and c(n) is the position feedback value c between t=nS+qT and t=(n+1)S+T.

Furthermore, $v_1(n)$ is the VCM voltage value sampled at t=nS, $v_2(n)$ is the VCM voltage value sampled at t=nS+T, and $v_3(n)$ is the VCM voltage value sampled at t=nS+2T. Moreover, $f_1(n)$ is the speed feedback value f between t=nS+qT and t=nS+(1+q)T, $f_2(n)$ is the speed feedback value f between t=nS+(1+q)T and t=nS+(2+q)T, and $f_3(n)$ is the speed feedback value f between t=nS+(2+q)T and t=(n+1)S+qT.

$u_1(n)$ is the current value u between t=nS+qT and t=nS+(1+q)T, $u_2(n)$ is the current value u between t=nS+(1+q)T and t=nS+(2+q)T, $u_3(n)$ is the current value u between t=nS+(2+q)T and t=(n+1)S+qT, and they are expressed as follows:

$$u_1(n)=c(n)+f_1(n) \quad (1)$$

$$u_2(n)=c(n)+f_2(n) \quad (2)$$

$$u_3(n)=c(n)+f_3(n) \quad (3)$$

At step S4 in FIG. 7, the position detector 21 samples the displacement value p(n) at t=nS, and inputs this displacement value p(n) to the position feedback operation unit 23. The position feedback operation unit 23 calculates the position feedback value c(n) on the basis of the displacement value p(n), updates the position feedback value to be inputted to the adder 25 from c(n−1) to c(n) at t=nS+qT, and keeps the position feedback value at c(n) until t=(n+1)S+qT (see FIG. 8A).

In addition, speed detector 22 samples the VCM voltage $v_1(n)$ at t=nS, and inputs this VCM voltage $v_1(n)$ to speed feedback operation unit 24. Speed feedback operation unit 24 calculates the speed feedback value $f_1(n)$ on the basis of the VCM voltage $v_1(n)$, updates the speed feedback value to be inputted to the adder 25 from $f_3(n−1)$ to $f_1(n)$ at t=nS+qT, and keeps the speed feedback value at $f_1(n)$ until t=nS+(1+q)T (see FIG. 8B).

Therefore, adder 25 and VCM driver 26 update the driving current from $u_3(n-1)$ $(=c(n-1)+f_3(n-1))$ to $u_1(n)$ $(=c(n)+f_1(n))$ at $t=nS+qT$, and keeps the driving current at $u_1(n)$ until $t=nS+(1+q)T$ (see FIG. 8C).

Next, at step S5 in FIG. 7, speed detector 22 samples the VCM voltage $v_2(n)$ at $t=nS+T$, and inputs this VCM voltage $v_2(n)$ to speed feedback operation unit 24. The speed feedback operation unit 24 calculates the speed feedback value $f_2(n)$ on the basis of the VCM voltage $v_2(n)$, updates the speed feedback value to be inputted to adder 25 from $f_1(n)$ to $f_2(n)$ at $t=nS+(1+q)T$, and keeps the speed feedback value at $f_2(n)$ until $t=nS+(2+q)T$ (see FIG. 8B).

Therefore, adder 25 and VCM driver 26 update the driving current from $u_1(n)$ $(=c(n)+f_1(n))$ to $u_2(n)$ $(=c(n)+f_2(n))$ at $t=nS+(1+q)T$, and keeps the driving current at $u_2(n)$ until $t=nS+(2+q)T$ (see FIG. 8C).

Next, at step S6 in FIG. 7, speed detector 22 samples the VCM voltage $v_3(n)$ at $t=nS+2T$, and inputs this VCM voltage $v_3(n)$ to speed feedback operation unit 24. Speed feedback operation unit 24 calculates the speed feedback value $f_3(n)$ on the basis of the VCM voltage $v_3(n)$, updates the speed feedback value to be inputted to adder 25 from $f_2(n)$ to $f_3(n)$ at $t=nS+(2+q)T$, and keeps the speed feedback value at $f_3(n)$ until $t=(n+1)S+qT$ (see FIG. 8B).

Therefore, adder 25 and VCM driver 26 update the driving current from $u_2(n)$ $(=c(n)+f_2(n))$ to $u_3(n)$ $(=c(n)+f_3(n))$ at $t=nS+(2+q)T$, and keeps the driving current at $u_3(n)$ until $t=(n+1)S+qT$ (see FIG. 8C).

Next, with returning to the step S4 in FIG. 7, position detector 21 samples the displacement value $p(n+1)$ at $t=(n+1)S$, and inputs this displacement value $p(n+1)$ to position feedback operation unit 23. Position feedback operation unit 23 calculates the position feedback value $c(n+1)$ on the basis of the displacement value $p(n+1)$, updates the position feedback value to be inputted to adder 25 from $c(n)$ to $c(n+1)$ at $t=(n+1)S+qT$, and keeps the position feedback value at $c(n+1)$ until $t=(n+2)S+qT$ (see FIG. 8A).

In addition, speed detector 22 samples the VCM voltage $v_1(n+1)$ at $t=(n+1)S$, and inputs this VCM voltage $v_1(n+1)$ to speed feedback operation unit 24. Speed feedback operation unit 24 calculates the speed feedback value $f_1(n+1)$ on the basis of the VCM voltage $v_1(n+1)$, updates the speed feedback value to be inputted to the adder 25 from $f_3(n)$ to $f_1(n+1)$ at $t=(n+1)S+qT$, and keeps the speed feedback value at $f_1(n+1)$ until $t=(n+1)S+(1+q)T$ (see FIG. 8B).

Therefore, adder 25 and VCM driver 26 update the driving current from $u_1(n)$ $(=c(n)+f_3(n))$ to $u_3(n+1)$ $(=c(n+1)+f_1(n+1))$ at $t=(n+1)S+qT$, and keeps the driving current at $u_1(n+1)$ until $t=(n+1)S+(1+q)T$ (see FIG. 8C).

In this manner, the displacement values $p(0)$, $p(1)$, $p(2)$, ..., are sampled respectively at $t=0, S, 2S, ...$, and the position feedback values are updated respectively $c(0)$, $c(1)$, $c(2)$, ..., at $t=qT$, $S+qT$, $2S+qT$, .... In addition, the VCM voltages $v_1(0)$, $v_2(0)$, $v_3(0)$, $v_1(1)$, $v_2(1)$, $v_3(1)$, $v_1(2)$, ..., are sampled respectively at $t=0, T, 2T, S, S+T, S+2T, 2S, ...$, and the speed feedback values are updated respectively to $f_1(0), f_2(0), f_3(0), f_1(1), f_2(1), f_3(1), f_1(2), ...$, at $t=qT$, $(1+q)T$, $(2+q)T$, $S+qT$, $S+(1+q)T$, $S+(2+q)T$, $2S+qT$, ....

It is defined that the time interval T of the sampling of the VCM voltage value v and the update of the speed feedback value f is one-third of the time interval S of the sampling of the displacement value p and the update of the position feedback value c. Therefore, in hard disk drive 100, it is possible to update the driving current u and apply negative feedback at the time intervals each of which is one-third of a time interval in a conventional disk apparatus.

FIG. 9 is a block diagram of the access servo loop in FIG. 5 when a disturbance (external force) is applied to the access mechanism 2. In FIG. 9, reference character $e(e_1, e_2, e_3)$ denotes the disturbance applied to the access mechanism 2 as variation of the driving current. The disturbance such as an external force by a flexible cable provided between head 8 and HDC 4 for data transmission is applied to access mechanism 2. The disturbance e is converted from the disturbance by the flexible cable and the like to a current. Therefore, units of the disturbance e are the same as those of the driving current u. In addition, reference character r denotes a position detection error possibly arising in position detector 21, and reference character m does a calculation error possibly arising in position feedback operation unit 23. Errors r and m will be described later.

Let $e_1(n)$ be the disturbance e applied to the driving current u between $t=nS$ and $t=nS+T$, let $e_2(n)$ be the disturbance e applied to the driving current u between $t=nS+T$ and $t=nS+2T$, and let $e_3(n)$ be the disturbance e applied to the driving current u between $t=nS+2T$ and $t=nS+3T$. In FIG. 9, the driving current passing through VCM 10 (VCM current) becomes u+e, that is:

$u_3(n-1)+e_1(n)$ between $t=nS$ and $t=nS+qT$, $u_1(n)+e_1(n)$ between $t=nS+qT$ and $t=nS+T$, $u_1(n)+e_2(n)$ between $t=nS+T$ and $t=nS+(1+q)T$, $u_2(n)+e_2(n)$ between $t=nS+(1+q)T$ and $t=nS+2T$, $u_2(n)+e_3(n)$ between $t=nS+2T$ and $t=nS+(2+q)T$, $u_3(n)+e_3(n)$ between $t=nS+(2+q)T$ and $t=(n+1)S$, $u_1(n)+e_1(n+1)$ between $t=(n+1)S$ and $t=(n+1)S+qT$, $u_1(n+1)+e_1(n+1)$ between $t=(n+1)S+qT$ and $t=(n+1)S+(1+q)T$.

Let an angle of the displacement from the target position of access mechanism 2 be $\theta$, let a speed be $\omega$, let an inertia be J, and let a torque constant be $k_t$, and a state equation of access mechanism 2 at the time of the driving current u of the VCM 10 being controlled like hard disk drive 100 and the disturbance e being applied becomes:

$$\begin{bmatrix} d\theta/dt \\ d\omega/dt \end{bmatrix} = \begin{bmatrix} 0 & 1 \\ 0 & 0 \end{bmatrix}\begin{bmatrix} \theta \\ \omega \end{bmatrix} + \begin{bmatrix} 0 \\ K_t/J \end{bmatrix}(u+e) \quad (4)$$

Digitizing of equation (4) will be considered below. Let $p_1(n)$, $p_2(n)$, $p_3(n)$, $p_1(n+1)$ be displacement values (units: tracks) of the access mechanism 2 from the target position respectively at $t=nS, nS+T, nS+2T$, and $(n+1)S$. The displacement value $p_1(n)$ is $p_1(n)=p(n)$ and $p_1(n+1)=p(n+1)$ respectively to displacement values $p(n)$ and $p(n+1)$ that are sampled by the position detector 21. In addition, let $\omega_1(n)$, $\omega_2(n)$, $\omega_3(n)$, and $\omega_1(n+1)$ be speeds (units: tracks/sampling time) of access mechanism 2 respectively at $t=nS, nS+T, nS+2T$, and $(n+1)S$.

In addition, it is assumed that $C=k_t/J$, and that $\theta_t$ is an angle (units: rad/track) equivalent to one track. Furthermore, it is defined:

$$Y_1(n) = \begin{bmatrix} p_1(n) \\ \omega_1(n) \\ u_3(n-1) \end{bmatrix}$$

$$Y_2(n) = \begin{bmatrix} p_2(n) \\ \omega_2(n) \\ u_1(n) \end{bmatrix}$$

$$Y_3(n) = \begin{bmatrix} p_3(n) \\ \omega_3(n) \\ u_2(n) \end{bmatrix}$$

$$Y_1(n+1) = \begin{bmatrix} p_1(n+1) \\ \omega_1(n) \\ u_3(n) \end{bmatrix}$$

$$A_f = \begin{bmatrix} 1 & 1 & (q-q^2/2)T^2C/\theta_t \\ 0 & 1 & qT^2C/\theta_t \\ 0 & 0 & 0 \end{bmatrix} \equiv \begin{bmatrix} 1 & 1 & a_1 \\ 0 & 1 & b_1 \\ 0 & 0 & 0 \end{bmatrix}$$

$$B_F = \begin{bmatrix} (1/2)(1-q)^2T^2C/\theta_t \\ (1-q)T^2C/\theta_t \\ 1 \end{bmatrix} \equiv \begin{bmatrix} a_2 \\ b_2 \\ 1 \end{bmatrix}$$

$$C_f = \begin{bmatrix} (1/2)T^2C/\theta_t \\ T^2C/\theta_t \\ 0 \end{bmatrix} \equiv \begin{bmatrix} a_3 \\ b_3 \\ 0 \end{bmatrix}$$

A discrete state equation of $Y_1(n)$ and $Y_2(n)$ (t=nS and t=nS+T) is:

$$Y_2(n) = A_f Y_1(n) + B_f u_1(n) + C_f e_1(n) \tag{5a}$$

In addition, a discrete state equation of $Y_2(n)$ and $Y_3(n)$ (t=nS+T and t=nS+2T) is:

$$Y_3(n) = A_f Y_2(n) + B_f u_2(n) + C_f e_2(n) \tag{6a}$$

Furthermore, a discrete state equation of $Y_3(n)$ and $Y_1(n+1)$ (t=nS+2T and t=(n+1)S) is:

$$Y_1(n+1) = A_f Y_3(n) + B_f u_3(n) + C_f e_3(n) \tag{7a}$$

Moreover, with applying the above-described equations (1) to (3), equations (5a) to (7a) becomes:

$$Y_2(n) = A_f Y_1(n) + B_f c(n) + B_f f_1(n) + C_f e_1(n) \tag{5b}$$

$$Y_3(n) = A_f Y_2(n) + B_f c(n) + B_f f_2(n) + C_f e_2(n) \tag{6b}$$

$$Y_1(n+1) = A_f Y_3(n) + B_f c(n) + B_f f_3(n) + C_f e_3(n) \tag{7b}$$

From equations (5b) to (7b), $$p_2(n) = p_1(n) + \omega_1(n) + a_1 c(n-1) + a_2 c(n) + a_1 f_3(n-1) + a_2 f_1(n) + a_3 e_1(n) \tag{5c}$$

$$p_3(n) = p_2(n) + \omega_2(n) + a_1 c(n) + a_2 c(n) + a_1 f_1(n) + a_2 f_2(n) + a_3 e_2(n) \tag{6c}$$

$$p_1(n+1) = p_3(n) + \omega_3(n) + a_1 c(n) + a_2 c(n) + a_1 f_2(n) + a_2 f_3(n) + a_3 e_3(n) \tag{7c}$$

$$\omega_2(n) = \omega_1(n) + b_1 c(n-1) + b_2 c(n) + b_1 f_3(n-1) + b_2 f_1(n) + b_3 e_1(n) \tag{5d}$$

$$\omega_3(n) = \omega_2(n) + b_1 c(n) + b_2 c(n) + b_1 f_1(n) + b_2 f_2(n) + b_3 e_2 \tag{6d}$$

$$\omega_1(n+1) = \omega_3(n) + b_1 c(n) + b_2 c(n) + b_1 f_2(n) + b_2 f_3(n) + b_3 e_3 \tag{7d}$$

The term $a_1 c(n-1)$ in equation (5c) is a term derived from calculation delay in position feedback operation unit 23. In addition, the term $a_1 f_3(n-1)$ in equation (5c), term $a_1 f_1(n)$ in equation (6c), and term $a_1 f_2(n)$ in equation (7c) are terms derived from calculate delay in speed feedback operation unit 24.

From equations (5a) to (7a), a discrete state equation of $Y_1(n)$ and $Y_1(n+1)$ (t=nS and t=(n+1)S) is:

$$\begin{aligned} Y_1(n+1) &= A_f 3 Y_1(n) + A_f 2 B_f u_1(n) + A_f B_f u_2(n) + \\ &\quad B_f u_3(n) + A_f 2 C_f e_1(n) + A_f C_f e_2(n) + C_f e_3(n) \\ &= D_f Y_1(n) + F_f u_1(n) + G_f u_2(n) + B_f u_3(n) + H_f e_1(n) + \\ &\quad I_f e_2(n) + C_f e_3(n) \end{aligned} \tag{8a}$$

Here, it is defined:

$$D_f = A_f 3 = \begin{bmatrix} 1 & 3 & (3q-q^2/2)T^2C/\theta_t \\ 0 & 1 & qT^2C/\theta_t \\ 0 & 0 & 0 \end{bmatrix} \equiv \begin{bmatrix} 1 & 3 & a_4 \\ 0 & 1 & b_4 \\ 0 & 0 & 0 \end{bmatrix}$$

$$F_f = A_f 2 B_f = \begin{bmatrix} (5/2-q)T^2C/\theta_t \\ T^2C/\theta_t \\ 0 \end{bmatrix} \equiv \begin{bmatrix} a_6 \\ b_6 \\ 0 \end{bmatrix}$$

$$G_f = A_f B_f = \begin{bmatrix} (3/2-q)T^2C/\theta_t \\ T^2C/\theta_t \\ 0 \end{bmatrix} \equiv \begin{bmatrix} a_7 \\ b_7 \\ 0 \end{bmatrix}$$

$$H_f = A_f 2 C_f = \begin{bmatrix} (5/2+2q-q^2/2)T^2C/\theta_t \\ (1+q)T^2C/\theta_t \\ 0 \end{bmatrix} \equiv \begin{bmatrix} a_8 \\ b_8 \\ 0 \end{bmatrix}$$

$$I_f = A_f C_f = \begin{bmatrix} (3/2+2q-q^2/2)T^2C/\theta_t \\ (1+q)T^2C/\theta_t \\ 0 \end{bmatrix} \equiv \begin{bmatrix} a_9 \\ b_9 \\ 0 \end{bmatrix}$$

With applying equations (1) to (3) to equation (8a):

$$\begin{aligned} Y_1(n+1) &= A_f 3 Y_1(n) + (A_f 2 + A_f + I) B_f c(n) + A_f 2 B_f f_1(n) + A_f B_f f_2(n) + B_f f_3(n) + \\ &\quad A_f 2 C_f e_1(n) + A_f C_f e_2(n) + C_f e_3(n) \\ &= D_f Y_1(n) + E_f c(n) + F_f f_1(n) + G_f f_2(n) + B_f f_3(n) + H_f e_1(n) + I_f e_2(n) + C_f e_3(n) \end{aligned} \tag{8b}$$

Here, it is defined:

$$I = \begin{bmatrix} 1 & 0 & 0 \\ 0 & 1 & 0 \\ 0 & 0 & 1 \end{bmatrix}$$

$$E_f = (A_f^2 + A_f + I)B_f = \begin{bmatrix} (q/2 - 3q - q^2/2)T^2C/\theta_t \\ (3-q)T^2C/\theta_t \\ 1 \end{bmatrix} \equiv \begin{bmatrix} a_5 \\ b_5 \\ 1 \end{bmatrix}$$

From equation (8b):

$p_1(n+1) =$ $p_1(n)+3\omega_1(n)+a_4c(n-1)+a_5c(n)+a_4f_3(n-1)+a_6f_1(n)+a_7f_2(n)+a_2f_3(n)+a_8e_1(n)+a_9e_2(n)+a_3e_3(n)$ (8c)

$\omega_1(n+1) =$ $\omega_1(n)+b_4c_3(n-1)+b_5c(n)+b_4f_3(n-1)+b_6f_1(n)+b_7f_2(n)+b_2f_3(n)+b_8e_1(n)+b_9e_2(n)+b_3e_3(n)$ (8d)

Speed feedback operation unit 24 calculates speed feedback values $f_1(n)$, $f_2(n)$, and $f_3(n)$ by using the following equations:

$f_1(n) = L[\{v_1(n)-Fu_3(n-1)\}-\{v_3(n-1)-Fu_2(n-1)\}]$ (9a)

$f_2(n) = L[\{v_2(n)-Fu_1(n)\}-\{v_1(n)-Fu_3(n-1)\}]$ (10a)

$f_3(n) = L[\{v_3(n)-Fu_2(n)\}-\{v_2(n)-Fu_1(n)\}]$ (11a)

In equations (9a) to (11a), terms L and F are feedback constants that are set beforehand and stored in the speed feedback operation unit 24. Here, let the feedback constant L be −0.05. In addition, the feedback constant F, as described at the step S1 in FIG. 7, is the resistance $r_v$ of the voice coil 10a (see FIG. 4) that is measured beforehand. In addition, past VCM voltage values and past driving current values u(n) that are used for the calculation of the speed feedback values $f_1(n)$, $f_2(n)$, and $f_3(n)$ are temporarily retained in the speed feedback operation unit 24.

With applying equations (1) to (3) to equations (9a) to (11a):

$f_1(n) = L[\{v_1(n)-v_3(n-1)\}-F\{f_3(n-1)-f_2(n-1)\}]$ (9b)

$f_2(n) = L[\{v_2(n)-v_1(n)\}-F\{f_1(n)-f_3(n-1)+c(n)-c(n-1)\}]$ (10b)

$f_3(n) = L[v_3(n)-v_2(n)-F\{f_2(n)-f_1(n)\}]$ (11b)

It is assumed that the time constant derived from the resistor $R_v$ and inductance $L_v$ of voice coil 10a (see FIG. 4) is sufficiently smaller than the sampling time interval T of the VCM voltage v. Then, VCM voltages $v_3(n-1)$, $v_1(n)$, $v_2(n)$, and $v_3(n)$ that are sampled are as follows respectively:

$v_3(n-1) = r_v u_2(n-1) + k_e\omega_3(n-1)$ (12)

$v_1(n) = r_v u_3(n-1) + k_e\omega_1(n)$ (13)

$v_2(n) = r_v u_1(n) + k_e\omega_2(n)$ (14)

$v_3(n) = r_v u_2(n) + k_e\omega_3(n)$ (15)

Here, $k_e$ is a back electromotive force constant of VCM 10.

With applying equations 12 to 15 to equations 9b to 11b:

$f_1(n) = Lk_e\{\omega_1(n)-\omega_3(n-1)\}$ (9c)

$f_2(n) = Lk_e\{\omega_2(n)-\omega_1(n)\}$ (10c)

$f_3(n) = Lk_e\{\omega_3(n)-\omega_2(n)\}$ (11c)

Therefore, the driving current terms $u_3(n-1)$, $u_1(n)$, $u_2(n)$, and $u_3(n)$ are not included in $f_1(n)$, $f_2(n)$, and $f_3(n)$. The speed feedback value $f_1(n)$ is proportional to the speed variation value $\omega_1(n)-\omega_3(n-1)$ between $t=(n-1)S+2T$ and $t=nS$, $f_2(n)$ is to the speed variation value $\omega_2(n)-\omega_1(n)$ between $t=nS$ and $t=nS+T$, and $f_3(n)$ is to the speed variation value $\omega_3(n)-\omega_2(n)$ between $t=nS+T$ and $t=nS+2T$, respectively with having a proportional constant $Lk_e$.

Thus, the speed feedback operation unit 24 calculates the speed feedback values $f_1(n)$, $f_2(n)$, and $f_3(n)$, which are proportional to the speed variation values of access mechanism 2 at the time intervals T, and feeds back these $f_1(n)$, $f_2(n)$, and $f_3(n)$ at the time intervals T to VCM driver 26.

When the VCM voltage $v_1(n)$ is inputted at t=nS, the speed feedback operation unit 24 calculates the speed feedback value $f_1(n)$ by the above-described Equation 9a by using L, and F $(=r_v)$ that are retained beforehand, the past VCM voltage $v_3(n-1)$, past driving currents $u_3(n-1)$ and $u_2(n-1)$ that are temporarily retained. Furthermore, speed feedback operation unit 24 updates the speed feedback value, to be inputted to adder 25, at t=nS+qT from $f_3(n-1)$ to $f_1(n)$. Moreover, speed feedback operation unit 24 temporarily retains the VCM voltage $v_1(n)$ and the driving current $u_1(n)$, updated by adder 25, for the calculation of the speed feedback value $f_2(n)$.

Next, if the VCM voltage $v_2(n)$ is inputted at t=nS+T, the speed feedback operation unit 24 calculates the speed feedback value $f_2(n)$ by the above-described Equation 10a by using L, and F $(=r_v)$ that are retained beforehand, the past VCM voltage $v_1(n)$, past driving currents $u_1(n)$ and $u_3(n-1)$ that are temporarily retained. Furthermore, speed feedback operation unit 24 updates the speed feedback value, to be inputted to adder 25, at t=nS+(1+q)T from $f_1(n)$ to $f_2(n)$. Moreover, speed feedback operation unit 24 temporarily retains the VCM voltage $v_2(n)$ and the driving current $u_2(n)$, updated by the adder 25, for the calculation of the speed feedback value $f_3(n)$.

Subsequently, if the VCM voltage $v_3(n)$ is inputted at t=nS+2T, the speed feedback operation unit 24 calculates the speed feedback value $f_3(n)$ by the above-described Equation 11a by using L, and F $(=r_v)$ that are retained beforehand, the past VCM voltage $v_2(n)$, past driving currents $u_2(n)$ and $u_1(n)$ that are temporarily retained. Furthermore, the speed feedback operation unit 24 updates the speed feedback value, to be inputted to the adder 25, at t=nS+(2+q)T from $f_2(n)$ to $f_3(n)$. Moreover, the speed feedback operation unit 24 temporarily retains the VCM voltage $v_3(n)$ and the driving current $u_3(n)$, updated by the adder 25, for the calculation of the speed feedback value $f_1(n+1)$.

In order to increase the precision of the speed feedback value f, it is desirable to perform the calibration of the feedback constant F at some extent of frequency by the measurement of the voice coil resistance $r_v$ at the step S1 in FIG. 7. This is because the voice coil resistance $r_v$ varies with time due to environmental temperature and the like. Speed detector 22 converts a VCM voltage v into a digital value v, and hence, if the access mechanism 2 is made not to move, it is possible to obtain the voice coil resistance $r_v$ by calculation from the VCM voltage v and driving current u. Therefore, it is not necessary to newly provide means for measuring the voice coil resistance $r_v$.

Here, the sampling timing of the VCM voltage v (thus, update timing of the speed feedback value f) and the sampling time interval of the VCM voltage v (thus, update time interval of the speed feedback value f) will be described. In order to reduce the influence of an disturbance applied to access mechanism 2, it is necessary that the sampling timing of the VCM voltage v and the update timing of the speed feedback value f are the timing of interpolating the sampling timing of the displacement value p and the update timing of the position feedback value c. Thus, it is necessary that the VCM voltage v is updated N times (N: one or larger arbitrary integer) during the sampling of the displacement value p and the next sampling, and the speed feedback value f is updated N times (N: one or larger arbitrary integer) during the sampling of the position feedback value c and the next sampling.

In addition, so as to decrease the influence of an disturbance applied to access mechanism 2, it is desirable to shorten the sampling time interval T of the VCM voltage v (thus, the update time interval of the speed feedback value f) within a range of being capable of calculating the speed feedback value f not including a variation component except speed. As described in FIG. 4, the back electromotive force ΔV arises in voice coil 10a of VCM 10 due to variation of the driving current as well as the back electromotive force $k_e\omega$ due to the movement of the access mechanism 2. In order to reduce the sampling time interval T, it is conceivable to configure the disk apparatus so that the VCM voltage v is continuously detected by an analog circuit and the like and the speed feedback value f is made to be continuously changed on the basis of the VCM voltage v continuously detected. Nevertheless, in this case, since the above-described back electromotive force ΔV that is a variation component except the speed is included in the VCM voltage v (thus, the speed feedback value f) that is detected, it becomes impossible to reduce the influence of the disturbance. Therefore, it is desirable to set the sampling time interval T so that the time interval (1−q)T from the speed feedback value f being updated to the VCM voltage v being sampled becomes longer than the time constant derived from the voice coil resistor $R_v$ and inductance $L_v$.

Let matrices $Z_1(n)$, $Z_2(n)$, $Z_3(n)$, $Z_1(n+1)$, A, B, and C be:

$$Z_1(n) = \begin{bmatrix} p_1(n) \\ \omega_1(n) \\ \omega_3(n-1) \\ u_3(n-1) \end{bmatrix}$$

$$Z_2(n) = \begin{bmatrix} p_2(n) \\ \omega_2(n) \\ \omega_1(n) \\ u_1(n) \end{bmatrix}$$

$$Z_3(n) = \begin{bmatrix} p_3(n) \\ \omega_3(n) \\ \omega_2(n) \\ u_2(n) \end{bmatrix}$$

$$Z_1(n+1) = \begin{bmatrix} p_1(n+1) \\ \omega_1(n+1) \\ \omega_3(n) \\ u_3(n) \end{bmatrix}$$

$$A = \begin{bmatrix} 1 & 1+Lk_{ea_2} & -Lk_{ea_2} & a_1 \\ 0 & 1+Lk_{eb_2} & -Lk_{eb_2} & b_1 \\ 0 & 1 & 0 & 0 \\ 0 & Lk_e & -Lk_e & 0 \end{bmatrix} \equiv \begin{bmatrix} 1 & a_{11} & a_{12} & a_1 \\ 0 & b_{11} & b_{12} & b_1 \\ 0 & 1 & 1 & 0 \\ 0 & d_1 & d_2 & 0 \end{bmatrix}$$

$$B = \begin{bmatrix} a_2 \\ b_2 \\ 0 \\ 1 \end{bmatrix}$$

$$C = \begin{bmatrix} a_3 \\ b_3 \\ 0 \\ 0 \end{bmatrix}$$

With applying equations 9c to 11c to equations 5b to 7b:

$$Z_2(n)=AZ_1(n)+Bc(n)+Ce_1(n) \tag{5e}$$

$$Z_3(n)=AZ_2(n)+Bc(n)+Ce2(n) \tag{6e}$$

$$Z_1(n+1)=AZ_3(n)+Bc(n)+Ce3(n) \tag{7e}$$

From equations (5e) to (7e):

$$p_2(n)=p_1(n)+a_{11}\omega_1(n)+(a_{12}+a_1d_1)\omega_3(n-1)+a_1d_2\omega_2(n-1)+a_1c(n-1)+a_2c(n)+a_3e_2(n) \tag{5f}$$

$$p_3(n)=p_2(n)+a_{11}\omega_2(n)+(a_{12}+a_1d_1)\omega_1(n)+a_1d_2\omega_3(n-1)+a_1c(n)+a_2c(n)+a_3e_2(n) \tag{6f}$$

$$p_1(n+1)=p_3(n)+a_{11}\omega_3(n)+(a_{12}+a_1d_1)\omega_2(n)+a_1d_2\omega_1(n)+a_1c(n)+a_2c(n)+a_3e_3(n) \tag{7f}$$

$$\omega_2(n)=b_{11}\omega_1(n)+(b_{12}+b_1d_1)\omega_3(n-1)+b_1d_2\omega_2(n-1)+b_1c(n-1)+b_2c(n)+b_3e_1(n) \tag{5g}$$

$$\omega_3(n)=b_{11}\omega_2(n)+(b_{12}+b_1d_1)\omega_1(n)+b_1d_2\omega_3(n-1)+b_1c(n)+b_2c(n)+b_3e_2(n) \tag{6g}$$

$$\omega_1(n+1)=b_{11}\omega_3(n)+(b_{12}+b_1d_1)\omega_2(n)+b_1d_2\omega_1(n)+b_1c(n)+b_2c(n)+b_3e_3(n) \tag{7g}$$

From equations (5e) to (7e), a discrete state equation of $Z_1(n)$ and $Z_1(n+1)$ (t=nS and t=(n+1)S) is:

$$Z_1(n+1)=A^3Z_1(n)+(A^2+A+I)Bc(n)+A^2Ce_1(n)+ACe_2(n)+Ce_3(n) \tag{8e}$$

Here, term I in equation (8e) is a unit matrix with 4 rows and 4 columns.

Equation (8a), (8b), or (8e) is an equation expressing an operating characteristic of access mechanism 2 including the feedback loop of the speed feedback value f in the case of receiving the disturbances $e_1(n)$, $e_2(n)$, and $e_3(n)$. By using equation 8a, 8b, or 8e and setting the calculation contents of position feedback operation unit 23 by using a well-known controller design method, it is possible to configure a suitable access servo loop.

Position feedback operation unit 23 calculates the position feedback value c(n) by using the following equation:

$$c(n)=k_1p(n)+k_2p(n-1)+k_3c(n-1)+k_4c(n-2)+k_ii(n) \tag{16a}$$

Here, coefficients $k_1$, $k_2$, $k_3$, $k_4$, and $k_i$ are feedback constants. In addition, term i(n) is an integral term:

$$i(n)=i(n-1)+p(n-1) \tag{17a}$$

Here, let r be a position detection error in position detector 21, and let a displacement value at the time of the position detection error r arising be y. There is a possibility of this position detection error r arising due to electronic noise, received by cables, wired between access mechanism 2 and position detector 21, and position detector 21, an A/D conversion error, an arithmetic operation error, and the like. In addition, let the displacement value y sampled at t=nS be y(n), and let the position detection error r included in the displacement value y(n) be r(n). If the position detection error r(n) arises, the following displacement value is inputted to position feedback operation unit 23:

$$y(n)=p(n)+r(n) \tag{18}$$

In addition, let m be a calculation error in position feedback operation unit 23, and let the position feedback value at the time of the calculation error m arising be z. There is a possibility of this calculation error arising due to the arithmetic operation error and the like. Furthermore, let the position feedback value z updated at t=nS+qT be z(n), and let the calculate error included in the position feedback value z(n) be m(n). If the calculation error m(n) arises, position feedback operation unit 23 outputs the position feedback value z(n)=c(n)+m(n). Moreover, if both of the position detection error r(n) and calculation error m(n) arise, the position feedback operation unit 23 calculates the position feedback value on the basis of y(n) that is inputted, and outputs the following position feedback value:

$$z(n)=c(n)+m(n) \tag{19a}$$

If the errors r(n) and m(n) arise, the displacement value p(n) in equations 16a and 17a become y(n) expressed in equation 18. Therefore, equations 16a and 17a become respectively:

$$c(n)=k_1 y(n)+k_2 y(n-1)+k_3 c(n-1)+k_4 c(n-2)+k_i i(n) \tag{16b}$$

$$i(n)=i(n-1)+y(n-1) \tag{17b}$$

In addition, with applying equation (16b) to equation (19a):

$$z(n)=k_1 y(n)+k_2 y(n-1)+k_3 c(n-1)+k_4 c(n-2)+k_i i(n)+m(n) \tag{19b}$$

Furthermore, term c(n) in equation (8e) becomes term z(n) in equation (19b).

The feedback constants $k_1$, $k_2$, $k_3$, $k_4$, and $k_i$ in equation (16b) are set beforehand by using a well-known controller design method. Here, the feedback constants $k_1$, $k_2$, $k_3$, $k_4$, and $k_i$ are set by using a minimum stationary variance method. In addition, as for the minimum stationary variance method, see Masashi Kisaka, *Proposal of minimum stationary variance method*, "*Institute of Electronics and Communication Engineers of Japan*, Vol. J76-A No. 3(1993), pp. 364–371."

Let a variance value of a discrete progression x (x(0), . . . , x(n−1), x(n), x(n+1), . . . ) be noted as $E(x^2)$ Thus:

$$E(x^2) = \lim_{N \to \infty} \left[ \sum_{n=0}^{N} \frac{x(n)^2}{N+1} \right]$$

Let the disturbance e ($e_1(0)$, $e_2(0)$, $e_3(0)$, $e_1(1)$, $e_2(1)$, $e_3(1)$, . . . , $e_1(n-1)$, $e_2(n-1)$, $e_3(n-1)$, $e_1(n)$, $e_2(n)$, $e_3(n)$, $e_1(n+1)$, . . . ) be white noise of a variance value W. Thus:

$$E(e_1 2)=E(e_2 2)=E(e_3 2)=W$$

In addition, let the position detection error r (r(0), . . . , r(n−1), r(n), r(n+1), . . . ) be white noise of a variance value M, and let the calculation error m (m(0), . . . , m(n−1), m(n), m(n+1), . . . ) be white noise of a variance value R. Thus:

$$E(m^2)=M$$

$$E(r^2)=R$$

The above-described minimum stationary variance method is a method for setting the feedback constants $k_1$, $k_2$, $k_3$, $k_4$, and $k_i$ so that an evaluation function H including the variance value $E(p_1 2)$ of a displacement value $p_1$ of the access mechanism 2 from the target position and the variance value $E(\omega_1 2)$ of the speed $\omega_1$ may become at a minimum.

Let the above-described evaluation function H be:

$$H=E(p_1 2)+100E(\omega_1 2)+0.1E(i^2) \tag{20}$$

In addition, let the torque constant $k_t$, the displacement angle per track $\theta_t$ of the access mechanism 2, the sampling time interval T of the VCM voltage, and the delay constant q, which are included in equations 8e and so on, be:

$$C=K_t/J=0.002/(0.1 \times 10^{-7})=2.0 \times 10^5$$

$$\theta_t=8.3 \times 10^{-5} \text{ [rad/track]}$$

$$T=7.9365 \times 10^{-5} \text{ [sec]}$$

$$q=0.5$$

In addition, let the variance values of the white noise, W, M, and R be:

$$W=0.01$$

$$M=0.01$$

$$R=100$$

Furthermore, let the feedback constant L of the speed feedback operation unit 24 be:

$$L=-0.05$$

With adequately using the above-described Equations 8e, 16b, 17b, and the like, the feedback constants $k_1$, $k_2$, $k_3$, $k_4$, and $k_i$ are obtained so that the evaluation function H expressed in equation 20 may become at a minimum.

Solutions obtained about position feedback operation unit 23 of hard disk drive 100 are:

$$k_1=-7.90 \times 10^{-3}$$

$$k_2=6.21 \times 10^{-3}$$

$$k_3=3.31 \times 10^{-2}$$

$$k_4=-1.19 \times 10^{-2}$$

$$k_i=-1.62 \times 10^{-4}$$

If the displacement value c(n) is inputted at t=nS, the position feedback operation unit 23 calculates the position feedback value c(n) by the Equation 16a by using the feedback constants $k_1$, $k_2$, $k_3$, $k_4$, and $k_i$, which are retained beforehand, and the past position feedback values c(n−1), c(n−2), and integral term i(n), which are temporarily retained. Furthermore, the position feedback operation unit 23 updates the position feedback value, which is inputted to the adder 25, from c(n−1) to c(n) at t=nS+qT. Then, the position feedback operation unit 23 calculates an integral term i(n+1) from the position feedback value c(n) and integral term i(n), and temporarily retains the position feedback value c(n) and integral term i(n+1) for the calculating of a position feedback value c(n+1).

Here, a conventional disk apparatus not having speed detector 22 and speed feedback operation unit 24 will be described. FIG. 10 is a block diagram of an access servo loop in the conventional disk apparatus, not having the speed detector 22 and speed feedback operation unit 24, when the disk apparatus performs track following. In addition, in FIG. 10, the same reference numerals are assigned to the same parts as those in FIG. 5.

The configuration of the access servo loop in FIG. 10 is the same as that of the access servo loop of hard disk drive 100 at the time of a track seek (see FIG. 6). A position detector 29 calculates the position feedback value c by equations 16a and 17a similarly to the position feedback operation unit 23. Nevertheless, values of the feedback constants $k_1$, $k_2$, $k_3$, $k_4$, and $k_i$ are different from those in position feedback operation unit 23.

In FIG. 10, u(n) is the driving current u between t=nS+qT and t=(n+1)S+qT. In addition, e($e_1$, $e_2$, $e_3$) is the disturbance described in FIG. 9.

In the conventional access servo loop, the VCM current u becomes:

$u(n-1)+e=(n)$ between $t=nS$ and $t=nS+qT$, $u(n)+e_1(n)$ between $t=nS+qT$ and $t=nS+T$, $u(n)+e_2(n)$ between $t=nS+T$ and $t=nS+2T$, $u(n)+e_3(n)$ between $t=nS+2T$ and $t=(n+1)S$, $u(n)+e_1(n+1)$ between $t=(n+1)S$ and $t=(n+1)S+qT$, or $u(n+1)+e_1(n+1)$ between $t=(n+1)S+qT$ and $t=(n+1)S+(1+q)T$ A discrete state equation of $Y_1(n)$ and $Y_1(n+1)$ in the conventional access servo loop (t=nS and t=(n+1)S) is:

$$Y_1(n+1) = A_f3Y_1(n) + (A_f2 + A_f + I)B_f u(n) + A_f 2 C_f e_1(n) + \quad (18a)$$
$$A_f C_f e_2(n) + C_f e_3(n)$$
$$= C_f Y_1(n) + F_f u(n) + D_t e_1(n) + E_t e_2(n) + B_t e_3(n)$$

With applying u(n)=c(n) to equation 18a:

$$Y_1(n+1) = A_f 3 Y_1(n) + (A_f 2 + A_f + I) B_f c(n) + A_f 2 C_f e_1(n) + \quad (18b)$$
$$A_f C_f e_2(n) + C_f e_3(n)$$
$$= D_f Y_1(n) + E_f c(n) + H_f e_1(n) + I_f e_2(n) + C_f e_3(n)$$

From equation 18b:

$$p_1(n+1) = \quad (18c)$$
$$p_1(n) + 3\omega_1(n) + a_4 c(n-1) + a_5 c(n) + a_8 e_1(n) + a_9 e_2(n) + a_3 e_3(n)$$

$$\omega_1(n+1) = \quad (18d)$$
$$\omega_1(n) + b_4 c_3(n-1) + b_5 c(n) + b_8 e_1(n) + b_9 e_2(n) + b_3 e_3(n)$$

Equations 18a, 18b, 18c, and 18d correspond to the equations 8a, 8b, 8c, and 8d in the access servo loop of hard disk drive 100. $Y_1(n+1)$ in hard disk drive 100 is obtained by adding $F_f f_1(n)+G_f f_2(n)+B_f f_3(n)$, which are terms derived from the speed feedback value f, to $Y_1(n+1)$ in the conventional disk apparatus.

In addition, equations 18a and 18b correspond to equation 8e at L=0, With rewriting the above-described 18b according to equation 8e:

$$Z_1(n+1)=A_g 3 Z_1(n)+(A_g 2+A_g+I)Bc(n)+A_g 2 C e_1(n)+A_g C e_2(n)+Ce_3(n) \quad (18e)$$

Here:

$$Ag = \begin{bmatrix} 1 & 1 & 0 & a_1 \\ 0 & 1 & 0 & b_1 \\ 0 & 1 & 0 & 0 \\ 0 & 0 & 0 & 0 \end{bmatrix}$$

$$I = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Constants $k_1$, $k_2$, $k_3$, $k_4$, and $k_i$ in position feedback operation unit 29 of conventional disk apparatus are set by using the same procedure as the setting procedure of the feedback constants in position feedback operation unit 23 by the minimum stationary variance method.

Solutions obtained about position feedback operation unit 29 of the conventional disk apparatus are:

$k_1 = -6.58 \times 10^{-3}$ $k_2 = 5.44 \times 10^{-3}$ $k_3 = -1.47 \times 10^{-2}$ $k_4 = 3.69 \times 10^{-2}$ $k_i = -1.46 \times 10^{-4}$ FIG. 11 is a graph showing the simulation result of following characteristics by using a servo loop (L=−0.05) according to the embodiment of the present invention and a conventional servo loop (L=0) in case of a disturbance e applying stepwise to access mechanism 2. In FIG. 11, curve A expresses the result of using the method according to the present invention, and curve B does the result of using the conventional method. In addition, the horizontal axis expresses time t (units: sec), and "S" such as "5S" and "10S" is the sampling time interval S of the displacement value of the position detector 21. Furthermore, the vertical axis expresses the displacement p (units: tracks) of (the head 8 of) the access mechanism 2 from the target position due to the disturbance e. The displacement p of this vertical axis is a simulation value, but is not a sampling value by the position detector 21.

In the simulation of the following characteristic shown in FIG. 11, it is assumed that the disturbance e is zero in t<0, the target position of the target track is followed at displacement p=0, the disturbance e stepwise changes from 0 to 1 at t=0, and the disturbance e is constantly 1 in t>0, In addition, it is assumed that both of the errors r and m are zero.

In FIG. 11, there are peaks of offsets by both servo loop according to the present invention and conventional servo loop near t=6S. Nevertheless, a peak value of the offset by the conventional servo loop is nearly 0.75 tracks, but a peak value of the offset by the servo loop according to the present invention is suppressed to nearly 0.55 tracks. Furthermore, the offset does not converge at zero after t=35S in the conventional servo loop, but the offset converges at zero after t=30S in the servo loop according to the present invention. It can be seen from FIG. 11 that the servo loop according to the present invention has an offset that is caused by the disturbance e and is smaller than that by the conventional servo loop, and is scarcely affected by the disturbance. Therefore, by applying the servo loop according to the present invention, it becomes possible to correspond to higher track density.

As described above, according to the embodiment of the present invention, it becomes possible to reduce the influence of the disturbance e applied to access mechanism 2 and to increase the precision of following the target position. This is because of such configuration that the servo apparatus according to the present invention samples the VCM voltage v two times during sampling the displacement value p of access mechanism 2, calculates the speed feedback value f two times on the basis of VCM voltage v during calculating the position feedback value c on the basis of the displacement value p, and drives the VCM by the driving current u=c+f that is obtained by adding the position feedback value c to the speed feedback value f. Owing to this, it becomes possible to make track width narrower, and hence it becomes possible to increase the data recording density.

In addition, the speed feedback value f is also updated even at the timing of updating the position feedback value c, but the speed feedback value f cannot be updated at the timing of updating the position feedback value c.

Furthermore, the VCM voltage is detected as a physical value that becomes a base for calculating the speed feedback value f (second feedback value), but the above-described physical value can be just a value including the speed of an access mechanism.

Moreover, the speed feedback value f (second feedback value) is proportional to the speed variation value of the access mechanism, but the speed feedback value f can be a value proportional to the speed of an access mechanism.

In addition, the sampling time interval T of the VCM voltage v is made to be one-third of the sampling time interval S of the displacement value p, but at least one time of sampling of the VCM voltage v can be performed during the sampling time interval S. Therefore, for example, let T be S, and each VCM voltage v can be also sampled at t=S/2, S+S/2, ..., (n−1)S+S/2, nS+S/2, (n+1)S+S/2, ....

Furthermore, the servo apparatus according to the present invention that is applied to the above-described embodiment detects a voltage generated in a motor and controls the driving current of the motor on the basis of this voltage. Nevertheless, a servo apparatus according to the present invention can be a servo apparatus that detects a current passing through the motor, and control the driving voltage of the motor on the basis of this current.

Moreover, a servo apparatus can have such configuration that a speed sensor 30 detecting a speed of the access mechanism 2 is provided to directly detect the speed of the access mechanism 2 as FIG. 12. As the speed sensor 30, for example, a speed detection coil, a sensor detecting the speed by the means whose capacitance varies according to the movement of an object, a sensor detecting the speed by irradiation of laser light, and the like can be used.

As described above, it becomes possible to reduce the influence of a disturbance applied to an access mechanism and to increase the precision of following a target position. This is because of such configuration that a servo apparatus according to the present invention discretely detects a physical value including the speed of the access mechanism at least once during discretely detecting a displacement value of the access mechanism, calculates a second feedback value at least once on the basis of the physical value, including the speed, during calculating a first feedback value on the basis of the displacement value of the access mechanism, and drives a motor of the access mechanism according to the first feedback value and the second feedback value. Owing to this, it becomes possible to make track width narrower, and hence it becomes possible to increase the data recording density.

While the invention has been particularly shown and described with reference to a preferred embodiment, it will be understood by those skilled in the art that various changes in form and detail may be made therein without departing from the spirit and scope of the invention.

What is claimed is:

1. A servo apparatus having an access mechanism, wherein said servo apparatus is driven by a voice coil motor to follow a target position of a disk within a disk drive, said servo apparatus comprising:

a first detector for detecting a displacement value of said access mechanism from a target position at predetermined time intervals;

a first feedback means for calculating a first feedback value on the basis of said displacement value;

a second detector for detecting a physical value, including a speed of the access mechanism, at least once in each of the predetermined time intervals, wherein said second detector also detects a voltage generated in said motor;

a second feedback means for calculating a second feedback value on the basis of said physical value; and a motor driver for driving said motor according to said first feedback value and said second feedback value, wherein said motor driver controls a driving current of said motor according to said first feedback value and said second feedback value.

2. The servo apparatus according to claim 1, wherein said motor driver controls a driving voltage of said motor according to said first feedback value and said second feedback value, wherein said second detector detects a current passing through said motor.

3. The servo apparatus according to claim 1, wherein said second detector has a speed sensor for detecting the speed of said access mechanism.

4. The servo apparatus according to claim 1, wherein said second feedback means obtains said second feedback value proportional to a speed or a speed variation amount of said access mechanism.

5. The servo apparatus according to claim 1, wherein said second detector detects a physical value including the speed N times, wherein N is an arbitrary integer equal to or larger than one, at each of the predetermined time intervals, wherein said second feedback means calculates said second feedback value N times at each of time intervals corresponding to the predetermined time intervals.

6. The servo apparatus according to claim 1, wherein said motor is a direct current motor having a voice coil, wherein said motor driver controls a current, passing through said voice coil, according to said first feedback value and said second feedback value, wherein said second detector detects a voltage value between terminals of the voice coil N times, wherein N is an arbitrary integer equal to or larger than 1, at each of the predetermined time intervals, wherein said second feedback means calculates said second feedback value proportional to a speed variation amount of the access mechanism on the basis of the voltage value between the terminals.

7. The servo apparatus according to claim 6, wherein a feedback constant previously set is L, a resistance of the voice coil that is measured beforehand is F, a detection time of the voltage value between the terminals is $t_k$, a detection time of the voltage value between the terminals just before the time $t_k$ is $t_{k-1}$, a detection time of the voltage value between the terminals just after the time $t_k$ is $t_{k+1}$, added values of the first feedback value and the second feedback value at the times $t_{k-1}$ and $t_k$ are $u_{k-1}$ and $u_k$ respectively, the voltage values between the terminals detected at the times $t_k$ and $t_{k+1}$ are $v_k$ and $v_{k+1}$) respectively, speeds of the access mechanism at the time $t_k$ and $t_{k+1}$ are $\omega_k$ and $\omega_{k+1}$, respectively, and second feedback values obtained on the basis of $v_k$ and $v_{k+1}$ are $f_k$ and $f_{k+1}$, and then the second feedback means calculates $f_{k+1}$ proportional to a speed variation amount of the access mechanism, $\omega_{k+1} - \omega_k$ by $f_{k+1} = L[(v_{k+1} - \ldots Fu_k) - (v_k - Fu_{k-1})]$.

8. The servo apparatus according to claim 1, wherein feedback constants previously set are $k_1$, $k_2$, $k_3$, $k_4$, and $k_i$, a detection time of the displacement value is $t_h$, a detection time of the displacement value just before the time $t_h$ is $t_{h-1}$, a detection time of the displacement value just after the time $t_h$ is $t_{h+1}$, the first feedback values at the times $t_{h-1}$ and $t_h$ are $c_{h-1}$ and $c_h$, respectively, the displacement values detected at the times $t_h$ and $t_{h+1}$ are $y_h$ and $y_{h+1}$ respectively, and second feedback values obtained on the basis of $y_h$ and $y_{h+1}$ are $c_h$ and $c_{h+1}$ respectively, and then the first feedback means calculates $c_{h+1}$, as follows:

$c_{h+1} = k_1 y_{h+1} + k_2 y_h + k_3 c_h + k_4 c_{h-1} + k_i i_{h+1}$, where $i_{h+1} = i_h + y_h$ and $i_1 = y_0$, and constants $k_1$, $k_2$, $k_3$, $k_4$, and $k^i$ are previously set by using a minimum stationary variance method.

9. A disk apparatus comprising:
a disk that is a data-recording medium, wherein data sectors recording data and servo sectors recording servo information are stored in said disk in an interleaved fashion;
an access mechanism that moves over said disk by a motor and accesses said disk, wherein said motor is a direct current motor having a voice coil; and
a servo means making said access mechanism follow a target position, wherein said servo means includes
a first detector discretely detecting a displacement value of the access mechanism from the target position at predetermined time intervals, wherein said first detector detects the displacement value on the basis of the servo information discretely read at each of the predetermined time intervals by the access mechanism;
a first feedback means calculating a first feedback value on the basis of the displacement value;
a second detector discretely detecting a physical value including a speed of the access mechanism at least once at each of the predetermined time intervals, wherein said second detector detects a voltage value between terminals of the voice coil N times, wherein N is an arbitrary integer equal to or larger than one, at each of the predetermined time intervals;
a second feedback means calculating a second feedback value on the basis of the physical value including the speed, wherein said second feedback means calculates a second feedback value proportional to a speed variation amount of the access mechanism on the basis of the voltage value between the terminals; and
a motor driver driving the motor according to the first feedback value and the second feedback value, wherein said motor driver controls a current, passing through the voice coil, according to a first feedback value and a second feedback value.

10. The disk apparatus according to claim 9, wherein it is assumed that a feedback constant previously set is L, a resistance of the voice coil that is measured beforehand is F, a detection time of the voltage value between the terminals is $t_k$, a detection time of the voltage value between the terminals just before the time $t_k$ is $t_{k-1}$, a detection time of the voltage value between the terminals just after the time $t_k$ is $t_{k+1}$, added values of the first feedback value and the second feedback value at the times $t_{k-1}$ and $t_k$ are $u_{k-1}$ and $u_k$ respectively, the voltage values between the terminals detected at the times $t_k$ and $t_{k+1}$ are $v_k$ and $v_{k+1}$ respectively, speeds of the access mechanism at the time $t_k$ and $t_{k+1}$ are $\omega_k$ and $\omega_{k+1}$, respectively, and second feedback values obtained on the basis of $v_k$ and $v_{k+1}$ are $f_k$ and $f_{k+1}$ respectively, and then the second feedback means calculates $f_{k+1}$ proportional to a speed variation amount of the access mechanism, $\omega_{k+1} - \omega_k$ by the following equation:

$$f_{k+1} = L[(v_{k+1} - \ldots Fu_k) - (v_k - Fu_{k-1})].$$

11. A method for controlling an access mechanism within a hard drive, wherein said method comprising:
detecting a displacement value of said access mechanism from a target position and calculating a first feedback value according to said displacement value; and
detecting a physical value including a speed of said access mechanism and calculating a second feedback value according to said physical value, wherein said detecting further includes a voltage value between terminals of the voice coil and calculating a second feedback value, proportional to a speed variation amount of the access mechanism on the basis of this voltage value between the terminals, wherein said detecting is executed N times, wherein N is an arbitrary integer equal to or larger than one, until next execution of a first step after the execution of said detecting a displacement value; and
driving said motor according to a first feedback value and a second feedback value, wherein said motor is a direct current motor having a voice coil, wherein said motor driver controls a current, passing through said voice coil, according to a first feedback value and a second feedback value.

12. The method according to claim 11, wherein a feedback constant is L, a resistance of the voice coil that is measured is F, a detection time of the voltage value between the terminals is $t_k$, a detection time of the voltage value between the terminals just before the time $t_k$ is $t_{k-1}$, a detection time of the voltage value between the terminals just after the time $t_k$ is $t_{k+1}$, added values of said first feedback value and the second feedback value at the times $t_{k-1}$ and $t_k$ are $u_{k-1}$ and $u_k$ respectively, the voltage values between the terminals detected at the times $t_k$ and $t_{k+1}$ are $v_k$ and $v_{k+1}$ respectively, speeds of the access mechanism at the time $t_k$ and $t_{k+1}$ are $\omega_k$ and $\omega_{k-1}$ respectively, and second feedback values obtained on the basis of $v_k$ and $v_{k+1}$ are $f_k$ and $f_{k+1}$, and said second detecting step further including a step of calculating $f_{k+1}$ proportional to a speed variation amount of the access mechanism, $\omega_{k+1} - \omega_k$ by the following equation:

$$f_{k+1} = L[(v_{k+1} - \ldots Fu_k) - (v_k - Fu_{k-1})].$$

* * * * *

UNITED STATES PATENT AND TRADEMARK OFFICE
CERTIFICATE OF CORRECTION

PATENT NO. : 6,754,031 B1
DATED : June 22, 2004
INVENTOR(S) : M. Kisaka

It is certified that error appears in the above-identified patent and that said Letters Patent is hereby corrected as shown below:

Column 16,
Lines 22-27, please substitute with the following:
-- With applying equations 9c to 11c to equations 5b to 7b:

$$Z_2(n) = AZ_1(n) + Bc(n) + Ce_1(n) \quad (5e)$$
$$Z_3(n) = AZ_2(n) + Bc(n) + Ce_2(n) \quad (6e)$$
$$Z_1(n+1) = AZ_3(n) + Bc(n) + Ce_3(n) \quad (7e) \quad --$$

Column 23,
Line 11, please delete and substitute the following:
-- and $t_{k+1}$ are $v_k$ and $v_{k+1}$ respectively, speeds of the access... --

Signed and Sealed this

Third Day of May, 2005

JON W. DUDAS
*Director of the United States Patent and Trademark Office*